US012529017B2

(12) United States Patent
Reese et al.

(10) Patent No.: US 12,529,017 B2
(45) Date of Patent: Jan. 20, 2026

(54) DETERGENT COMPOSITION COMPRISING A LIPASE

(71) Applicant: Novozymes A/S, Bagsvaerd (DK)

(72) Inventors: Nathan Reese, Wake Forest, NC (US); Domenic Anthony Paone, Roanoke, VA (US); Thomas Patrick Gibbons, Wake Forest, NC (US); Mark Stephenson Smith, Stem, NC (US); Lone Baunsgaard, Helsingoer (DK)

(73) Assignee: Novozymes A/S, Bagsvaerd (DK)

( * ) Notice: Subject to any disclaimer, the term of this patent is extended or adjusted under 35 U.S.C. 154(b) by 324 days.

(21) Appl. No.: 18/252,226

(22) PCT Filed: Nov. 9, 2021

(86) PCT No.: PCT/US2021/058557
§ 371 (c)(1),
(2) Date: May 9, 2023

(87) PCT Pub. No.: WO2022/103725
PCT Pub. Date: May 19, 2022

(65) Prior Publication Data

US 2023/0407209 A1 Dec. 21, 2023

Related U.S. Application Data

(60) Provisional application No. 63/113,293, filed on Nov. 13, 2020.

(51) Int. Cl.
*C11D 3/00* (2006.01)
*C11D 1/83* (2006.01)
(Continued)

(52) U.S. Cl.
CPC ............ *C11D 3/38627* (2013.01); *C11D 1/83* (2013.01); *C11D 3/0068* (2013.01);
(Continued)

(58) Field of Classification Search
CPC ..... C11D 3/38627; C11D 1/83; C11D 3/0068; C11D 3/2086; C11D 3/2093; C11D 1/146; C11D 1/22; C11D 1/72; C11D 2111/12
(Continued)

(56) References Cited

U.S. PATENT DOCUMENTS 6,194,475 B1 2/2001 Boinowitz et al.
6,979,669 B2 * 12/2005 Raehse ................ C11D 3/0068
252/186.25
(Continued)

FOREIGN PATENT DOCUMENTS

CN 1549855 A 11/2004
CN 103374180 A 10/2013
(Continued)

OTHER PUBLICATIONS

Innovative Chemical Technologies, Inc., 2021, Technical Data Sheet—Flexisorb OD-120ZnR.
(Continued)

*Primary Examiner* — Eisa B Elhilo
(74) *Attorney, Agent, or Firm* — Yoshimi D. Barron

(57) ABSTRACT

The present invention relates to detergent compositions capable of reducing odor generated by a lipase during cleaning or washing of laundry comprising (a) a surfactant or a surfactant system; (b) a lipase; and (c) ricinoleic acid, a ricinoleic salt, or a ricinoleic ester. The invention also relates to methods for cleaning or washing of laundry by contacting the laundry with a composition of the invention.

12 Claims, 1 Drawing Sheet

Specification includes a Sequence Listing.

(51) Int. Cl.
*C11D 3/20* (2006.01)
*C11D 3/386* (2006.01)
*C11D 1/14* (2006.01)
*C11D 1/22* (2006.01)
*C11D 1/72* (2006.01)

(52) U.S. Cl.
CPC .......... *C11D 3/2086* (2013.01); *C11D 3/2093* (2013.01); *C11D 1/146* (2013.01); *C11D 1/22* (2013.01); *C11D 1/72* (2013.01); *C11D 2111/12* (2024.01)

(58) Field of Classification Search
USPC .......................... 510/226, 300, 392, 530, 535
See application file for complete search history.

(56) References Cited

U.S. PATENT DOCUMENTS

| | | | | |
|---|---|---|---|---|
| 2003/0133892 | A1 | 7/2003 | Lersch et al. | |
| 2004/0198629 | A1 | 10/2004 | Raehse et al. | |
| 2007/0212253 | A1 | 9/2007 | Elrod | |
| 2008/0226886 | A1 | 9/2008 | Klausnitzer et al. | |
| 2009/0124989 | A1 | 5/2009 | Wastlund-Karlsson et al. | |
| 2012/0204760 | A1 | 8/2012 | Puhala et al. | |
| 2015/0132831 | A1* | 5/2015 | Olinski .............. | C11D 3/38627 510/393 |
| 2016/0000955 | A1 | 1/2016 | Davison et al. | |
| 2016/0076012 | A1* | 3/2016 | Malten ..................... | C12N 9/18 435/197 |
| 2017/0029745 | A1 | 2/2017 | Nakamura et al. | |
| 2019/0144791 | A1* | 5/2019 | Bettiol ..................... | C11D 9/40 510/392 |
| 2019/0144794 | A1* | 5/2019 | Velasquez ............ | C12N 9/0069 510/392 |
| 2019/0390144 | A1 | 12/2019 | Piorkowski | |
| 2020/0199493 | A1 | 6/2020 | Piorkowski | |

FOREIGN PATENT DOCUMENTS

| | | | | | |
|---|---|---|---|---|---|
| CN | 106566692 | A * | 4/2017 | ............... | C11D 1/83 |
| CN | 107820515 | A | 3/2018 | | |
| CN | 109260043 | A | 1/2019 | | |
| CN | 111892813 | A | 11/2020 | | |
| DE | 10043118 | A | 3/2002 | | |
| DE | 10043118 | A1 * | 3/2002 | ........... | C11D 3/2093 |
| EP | 3581616 | A1 | 12/2019 | | |
| WO | 01/18163 | A1 | 3/2001 | | |
| WO | 0212423 | A2 | 2/2002 | | |
| WO | 2016102356 | A1 | 6/2016 | | |
| WO | 2016/184944 | A1 | 11/2016 | | |
| WO | 2016176241 | A1 | 11/2016 | | |
| WO | WO 2017100051 | A2 * | 6/2017 | ............... | C11D 1/29 |

OTHER PUBLICATIONS

Wang, 2006, Scientific and Technical Documents Publishing House, 54-Tr.

* cited by examiner

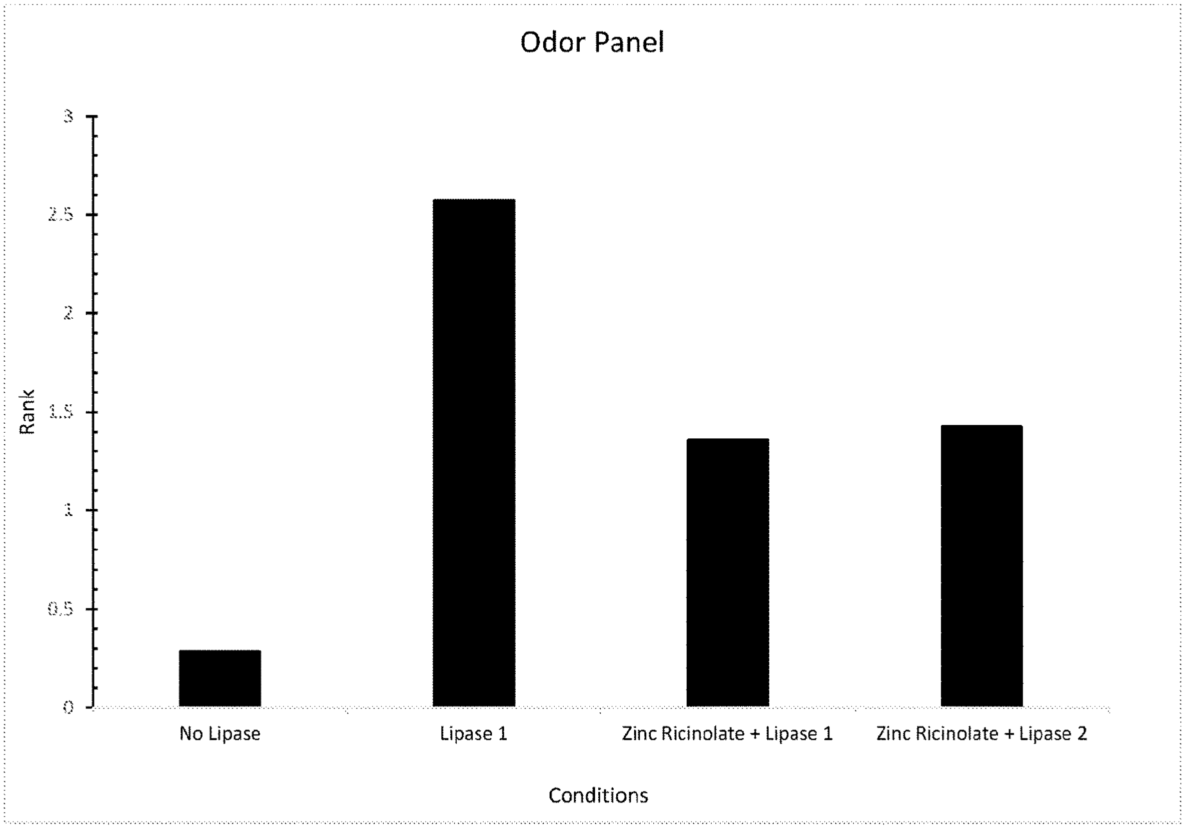
Odor Panel
Rank
3
2.5
2
1.5
1
0.5
0
No Lipase
Lipase 1
Zinc Ricinolate + Lipase 1
Zinc Ricinolate + Lipase 2
Conditions

SEQUENCE LISTING

```
<160> NUMBER OF SEQ ID NOS: 1

<210> SEQ ID NO 1
<211> LENGTH: 269
<212> TYPE: PRT
<213> ORGANISM: Thermomyces lanuginosus
<220> FEATURE:
<221> NAME/KEY: mat_peptide
<222> LOCATION: (1)..(269)

<400> SEQUENCE: 1

Glu Val Ser Gln Asp Leu Phe Asn Gln Phe Asn Leu Phe Ala Gln Tyr
1               5                   10                  15

Ser Ala Ala Ala Tyr Cys Gly Lys Asn Asn Asp Ala Leu Ala Gly Thr
            20                  25                  30
```

-continued

```
Asn Ile Thr Cys Thr Gly Asn Ala Cys Pro Glu Val Glu Lys Ala Asp
        35                  40                  45

Ala Thr Phe Leu Tyr Ser Phe Glu Asp Ser Gly Val Gly Asp Val Thr
    50                  55                  60

Gly Phe Leu Ala Leu Asp Asn Thr Asn Lys Leu Ile Val Leu Ser Phe
65                  70                  75                  80

Arg Gly Ser Arg Ser Ile Glu Asn Trp Ile Gly Asn Leu Asn Phe Asp
                85                  90                  95

Leu Lys Glu Ile Asn Asp Ile Cys Ser Gly Cys Arg Gly His Asp Gly
            100                 105                 110

Phe Thr Ser Ser Trp Arg Ser Val Ala Asp Thr Leu Arg Gln Lys Val
        115                 120                 125

Glu Asp Ala Val Arg Glu His Pro Asp Tyr Arg Val Val Phe Thr Gly
    130                 135                 140

His Ser Leu Gly Gly Ala Leu Ala Thr Val Ala Gly Ala Asp Leu Arg
145                 150                 155                 160

Gly Asn Gly Tyr Asp Ile Asp Val Phe Ser Tyr Gly Ala Pro Arg Val
                165                 170                 175

Gly Asn Arg Ala Phe Ala Glu Phe Leu Thr Val Gln Thr Gly Gly Thr
            180                 185                 190

Leu Tyr Arg Ile Thr His Thr Asn Asp Ile Val Pro Arg Leu Pro Pro
        195                 200                 205

Arg Glu Phe Gly Tyr Ser His Ser Ser Pro Glu Tyr Trp Ile Lys Ser
    210                 215                 220

Gly Thr Leu Val Leu Val Thr Arg Asn Asp Ile Val Lys Ile Glu Gly
225                 230                 235                 240

Ile Asp Ala Thr Gly Gly Asn Asn Gln Pro Asn Ile Pro Asp Ile Pro
                245                 250                 255

Ala His Leu Trp Tyr Phe Gly Leu Ile Gly Thr Cys Leu
            260                 265
```

DETERGENT COMPOSITION COMPRISING A LIPASE

CROSS-REFERENCE TO RELATED APPLICATIONS

This application is a 35 U.S.C. 371 national application of international application no. PCT/US2021/058557 filed Nov. 9, 2021 which claims priority or the benefit under 35 U.S.C. 119 of U.S. application No. 63,113,293 filed Nov. 13, 2020, the contents of which are fully incorporated herein by reference.

REFERENCE TO A SEQUENCE LISTING

This application contains a Sequence Listing in computer readable form, which is incorporated herein by reference.

BACKGROUND OF THE INVENTION

Field of the Invention

The present invention relates to detergent compositions capable of reducing odor generated by a lipase during cleaning or washing of laundry and methods of cleaning or washing laundry using a detergent composition of the invention.

Description of the Related Art

Detergent composition for laundry cleaning or washing comprising enzymes are well-known. Although the detailed ingredient lists for such detergent compositions vary considerably across geographies, the main detergency mechanisms are similar. Soils and stains are removed by mechanical action assisted by enzymes, surfactants, and other ingredients. Historically, proteases were the first to be used extensively in laundering. Today, lipases, alpha-amylases, mannanases, cellulases, and RNases have been introduced to increase the effectiveness, especially for household laundering at lower temperatures.

Lipases break down fats into fatty acids that are solubilized in the surfactants. Lipases with good wash performance form odor-generating short-chain fatty acids, such as butyric acid, which give an unpleasant smell.

WO 01/18163 discloses laundry detergent compositions which are incorporated with stable, quick dissolving, free flowing cyclodextrin in granular form for removing malodor from laundered items during automatic washing. The composition may further include proteases, amylases, lipases, and cellulases, as well as mixtures thereof.

There is still a need for detergent compositions which reduce odor generated by lipase during cleaning or washing of laundry.

SUMMARY OF THE INVENTION

The present invention relates to detergent compositions capable of reducing odor generated by a lipase during cleaning or washing of laundry comprising:

(a) a surfactant or a surfactant or surfactant system;

(b) a lipase; and (c) ricinoleic acid, a ricinoleic salt, or a ricinoleic ester.

In a preferred embodiment, the deterrent composition of the invention is a liquid composition, wherein the composition comprises water.

The detergent composition of the invention may besides a surfactant or a surfactant system, lipase and ricinoleic acid, a ricinoleic salt, or a ricinoleic ester further comprise one or more components selected from the group of builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, fabric softeners, carriers, hydrotropes, processing aids, solvents and/or pigments.

In a preferred embodiment, the detergent composition of the invention comprises zinc ricinoleate, potassium ricinoleate, or sodium ricinoleate. In some embodiments, a composition of the invention comprises methyl ricinoleate, ethyl ricinoleate, isopropyl ricinoleate, or glycol ricinoleate. In preferred specific embodiments, a composition of the invention comprises zinc ricinoleate or methyl ricinoleate.

In a preferred embodiment, the detergent composition of the invention comprises a lipase derived from a strain of *Thermomyces lanuginosus* (TLL), in particular, the lipase shown in SEQ ID NO: 1; or a variant thereof. In preferred specific embodiments, the lipase is any of Lipase 1 or Lipase 2 tested and disclosed in the Examples below.

In an embodiment, the detergent composition of the invention comprises a commencial lipase product selected from the group of Lipolase™, Lipex™; Lipolex™, Lipoclean™, Lipex Evity 100L, Lipex Evity 105T, Lipex Evity 200L (from Novozymes), Lumafast (originally from Genencor), Preferenz L100 (Danisco US Inc.), and Lipomax (originally from Gist-Brocades).

The invention also relates to methods for cleaning or washing of laundry comprising contacting the laundry with a composition of the invention.

"Laundry" includes in context of the invention in particular texiles, clothes, linen or the like, that is in need of cleaning or washing. In particular, the laundry may be soiled so that washing or cleaning is needed to remove lipid stains, such as lard, fats, oils or the like. Lipids include glycerides (e.g., triglycerides), phospholipids, glycolipids, and fatty acids.

A washing or cleaning method of the invention is typically carried out in a laundry washing machine (e.g., top loader or front loader) but may also be performed in other ways such as manually.

According to the method of the invention, lipase is dosed at a concentration of 0.01-5 mg enzyme protein (EP)/L wash water, in particular, 0.1-1 mg enzyme protein/L wash water. In a preferred embodiment of the invention zinc ricinoleate is dosed at a concentration of 1-50 mg/L, preferably 5-25 mg/L, in particular 10-20 mg/L wash water. In a preferred embodiment of the invention methyl ricinoleate constitutes 0.01-10 wt. %, preferably 0.3-1.5 wt. % of the detergent composition. In an embodiment the ratio between lipase and zinc ricinoleate and/or methyl ricinoleate is between 1:50 and 1:1, such as between 1:40 and 1:2, such as between 1:30 and 1:3. According to the invention odor generation may be reduced by at least 5%, at least 10%, at least 20%, at least 30%, at least 40%, at least 50%, at least 60%, at least 70%, at least 80%, at least 90%, at least 95%, at least 97%, at least 99% compared to washing under the same conditions without a lipase being present. As disclosed in Example 1, odor generation may be determined by a trained odor panel after washing butter swatches using Model J detergent, lipase, and zinc ricinoleate at 20-40° C., preferably 25-35° C., in particular, 90° F. (approx. 32° C.) for 10-30 minutes, preferably 15-20 minutes. Alternatively, as disclosed in Example 2, odor generation may be determined using Solid Phase Micro Extraction Gas Chromatography (SPME-GC) to analyze swatches washed using Model E1 detergent, lipase, and methyl ricinoleate at 15-45° C., preferably 15-25° C., in particular, 20° F. (approx. 68° C.) for 10-30 minutes, preferably 20-25 minutes.

BRIEF DESCRIPTION OF THE FIGURE

FIG. 1 shows the odor panel's evaluation of butter swatches washed with a liquid laundry detergent (Model J detergent)

without lipase;
with Lipase 1;
with Lipase 1 and zinc ricinoleate (ZR);
with Lipase 2 and zinc ricinoleate (ZR).

DEFINITIONS

Lipase: The terms "lipase", "lipase enzyme", "lipolytic enzyme", "lipid esterase", "lipolytic polypeptide", and "lipolytic protein" refers to an enzyme in class EC3.1.1 as defined by Enzyme Nomenclature. It may have lipase activity (triacylglycerol lipase, EC3.1.1.3), cutinase activity (EC3.1.1.74), sterol esterase activity (EC3.1.1.13) and/or wax-ester hydrolase activity (EC3.1.1.50). For purposes of the present invention lipase activity (i.e., the hydrolytic activity of the lipase) may be determined with a pNP assay using substrates with various chain length as described in the "Materials and Methods"-section.

Fragment: The term "fragment" means a polypeptide having one or more (e.g., several) amino acids absent from the amino and/or carboxyl terminus of a polypeptide; wherein the fragment has lipase activity. In one aspect, a fragment contains at least 50%, at least 55%, at least 60%, at least 65%, at least 70%, at least 75%, at least 80%, at least 85%, at least 90%, or at least 95% but less than 100% of the number of amino acids 1 to 269 of SEQ ID NO: 1.

Reduced Odor Generation: Reduced odor generation may, as described in Example 1, be determined on an odor intensity scale by a trained odor panel, but may also be determined using other methods, such as analytical methods, including the butyric acid release method described in WO 2017/001673 (see page 91, line 27+) where odor caused by lipase is measured by Solid Phase Micro Extraction Gas Chromatography (SPME-GC) as described in Example 2.

Parent or parent lipase: The term "parent" or "parent lipase" means a lipase to which an alteration is made to produce the enzyme variants. The parent lipase may be a naturally occurring (wild-type) polypeptide or a variant or fragment thereof. In a preferred embodiment, the parent lipase is the one shown in SEQ ID NO: 1.

Sequence identity: The relatedness between two amino acid sequences is described by the parameter "sequence identity".

For purposes of the present invention, the sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix. The output of Needle labeled "longest identity" (obtained using the—nobrief option) is used as the percent identity and is calculated as follows:

(Identical Residues×100)/(Length of Alignment−Total Number of Gaps in Alignment)

Laundry: The term "laundry" means textiles, clothes, linen or the like, in need of washing or cleaning. Laundry may be made from any material including yarns, yarn intermediates, fibers, non-woven materials, natural materials, synthetic materials, and any other textile material, fabrics made of these materials and products made from fabrics (e.g., garments and other articles). The textile or fabric may be in the form of knits, wovens, denims, non-wovens, felts, yarns, and towelling. The textile may be cellulose based such as natural cellulosics, including cotton, flax/linen, jute, ramie, sisal or coir or manmade cellulosics (e.g., originating from wood pulp) including viscose/rayon, cellulose acetate fibers (tricell), lyocell or blends thereof. The textile or fabric may also be non-cellulose based such as natural polyamides including wool, camel, cashmere, mohair, rabbit and silk or synthetic polymers such as nylon, aramid, polyester, acrylic, polypropylene and spandex/elastane, or blends thereof as well as blends of cellulose based and non-cellulose based fibers. Examples of blends are blends of cotton and/or rayon/viscose with one or more companion material such as wool, synthetic fiber (e.g., polyamide fiber, acrylic fiber, polyester fiber, polyvinyl chloride fiber, polyurethane fiber, polyurea fiber, aramid fiber), and/or cellulose-containing fiber (e.g., rayon/viscose, ramie, flax/linen, jute, cellulose acetate fiber, lyocell). Fabric may be conventional washable laundry, for example stained household laundry. When the term fabric or garment is used it is intended to include the broader term textiles as well. In the context of the present invention, the term "laundry" also covers fabrics.

Variant: The term "variant" means a polypeptide having lipase activity comprising an alteration, i.e., a substitution, insertion, and/or deletion, at one or more (e.g., several) positions. A substitution means replacement of the amino acid occupying a position with a different amino acid; a deletion means removal of the amino acid occupying a position; and an insertion means adding an amino acid adjacent to and immediately following the amino acid occupying a position.

Wash Performance: Wash performance may be tested using the well-known "Automatic Mechanical Stress Assay" (AMSA) disclosed in WO 02/42740 incorporated by reference (see especially the paragraph "Special method embodiments" at pages 23-24). For the purposes of the present invention, the wash performance may be tested using AMSA with for instance Model J detergent. The Model J detergent comprises a surfactant system comprising anionic surfactant and nonionic surfactants (see Example 1). The relative wash performance may be determined as the wash performance in the presence of lipase and zinc ricinoleate and/or methyl ricinoleate compared to the wash performance when zinc ricinoleate and/or methyl ricinoleate is not present.

Wild-type lipase: The term "wild-type" lipase means a lipase expressed by a naturally occurring microorganism, such as a bacterium, yeast, or filamentous fungus found in nature. In an embodiment, the wild-type lipase may be the one shown in SEQ ID NO: 1, which is derived from *Thermomyces lanuginosus* DSM 4109 (synonym *Humicola lanuginosa* DSM 4109).

Conventions for Designation of Variants

For purposes of the present invention, the lipase disclosed as SEQ ID NO: 1 is used to determine the corresponding amino acid residue in another lipase. The amino acid sequence of another lipase is aligned with SEQ ID NO: 1, and based on the alignment, the amino acid position number corresponding to any amino acid residue in the polypeptide disclosed in SEQ ID NO: 1 is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 5.0.0 or later. The parameters used are gap open penalty of 10, gap extension penalty of 0.5, and the EBLOSUM62 (EMBOSS version of BLOSUM62) substitution matrix.

Identification of the corresponding amino acid residue in another lipase can be determined by an alignment of multiple polypeptide sequences using several computer programs including, but not limited to, MUSCLE (multiple sequence comparison by log-expectation; version 3.5 or later; Edgar, 2004, *Nucleic Acids Research* 32: 1792-1797), MAFFT (version 6.857 or later; Katoh and Kuma, 2002, *Nucleic Acids Research* 30: 3059-3066; Katoh et al., 2005, *Nucleic Acids Research* 33: 511-518; Katoh and Toh, 2007, *Bioinformatics* 23: 372-374; Katoh et al., 2009, *Methods in Molecular Biology* 537: 39-64; Katoh and Toh, 2010, *Bioinformatics* 26:_1899-1900), and EMBOSS EMMA employing ClustalW (1.83 or later; Thompson et al., 1994, *Nucleic Acids Research* 22: 4673-4680), using their respective default parameters.

When the other enzyme has diverged from the lipase of SEQ ID NO: 1 such that traditional sequence-based comparison fails to detect their relationship (Lindahl and Elofsson, 2000, *J. Mol. Biol.* 295: 613-615), other pairwise sequence comparison algorithms can be used. Greater sensitivity in sequence-based searching can be attained using search programs that utilize probabilistic representations of polypeptide families (profiles) to search databases. For example, the PSI-BLAST program generates profiles through an iterative database search process and is capable of detecting remote homologs (Atschul et al., 1997, *Nucleic Acids Res.* 25: 3389-3402). Even greater sensitivity can be achieved if the family or superfamily for the polypeptide has one or more representatives in the protein structure databases. Programs such as GenTHREADER (Jones, 1999, *J. Mol. Biol.* 287: 797-815; McGuffin and Jones, 2003, *Bioinformatics* 19: 874-881) utilize information from a variety of sources (PSI-BLAST, secondary structure prediction, structural alignment profiles, and solvation potentials) as input to a neural network that predicts the structural fold for a query sequence. Similarly, the method of Gough et al., 2000, *J. Mol. Biol.* 313: 903-919, can be used to align a sequence of unknown structure with the superfamily models present in the SCOP database. These alignments can in turn be used to generate homology models for the polypeptide, and such models can be assessed for accuracy using a variety of tools developed for that purpose.

For proteins of known structure, several tools and resources are available for retrieving and generating structural alignments. For example, the SCOP superfamilies of proteins have been structurally aligned, and those alignments are accessible and downloadable. Two or more protein structures can be aligned using a variety of algorithms such as the distance alignment matrix (Holm and Sander, 1998, *Proteins* 33: 88-96) or combinatorial extension (Shindyalov and Bourne, 1998, *Protein Engineering* 11: 739-747), and implementation of these algorithms can additionally be utilized to query structure databases with a structure of interest in order to discover possible structural homologs (e.g., Holm and Park, 2000, *Bioinformatics* 16: 566-567).

In describing variants used in context of the invention, the nomenclature described below is adapted for ease of reference. The accepted IUPAC single letter or three letter amino acid abbreviation is employed.

Substitutions. For an amino acid substitution, the following nomenclature is used: Original amino acid, position, substituted amino acid. Accordingly, the substitution of threonine at position 226 with alanine is designated as "Thr226Ala" or "T226A". Multiple mutations are separated by addition marks ("+"), e.g., "Gly205Arg+Ser411Phe" or "G205R+S411F", representing substitutions at positions 205 and 411 of glycine (G) with arginine (R) and serine (S) with phenylalanine (F), respectively.

Deletions. For an amino acid deletion, the following nomenclature is used: Original amino acid, position, *. Accordingly, the deletion of glycine at position 195 is designated as "Gly195*" or "G195*". Multiple deletions are separated by addition marks ("+"), e.g., "Gly195*+Ser411*" or "G195*+S411*".

Insertions. For an amino acid insertion, the following nomenclature is used: Original amino acid, position, original amino acid, inserted amino acid. Accordingly, the insertion of lysine after glycine at position 195 is designated "Gly195GlyLys" or "G195GK". An insertion of multiple amino acids is designated [Original amino acid, position, original amino acid, inserted amino acid #1, inserted amino acid #2; etc.]. For example, the insertion of lysine and alanine after glycine at position 195 is indicated as "Gly195GlyLysAla" or "G195GKA".

In such cases the inserted amino acid residue(s) are numbered by the addition of lower case letters to the position number of the amino acid residue preceding the inserted amino acid residue(s). In the above example, the sequence would thus be:

| Parent: | Variant: |
|---|---|
| 195<br>G | 195 195a 195b<br>G - K - A |

Multiple alterations. Variants comprising multiple alterations are separated by addition marks ("+"), e.g., "Arg170Tyr+Gly195Glu" or "R170Y+G195E" representing a substitution of arginine and glycine at positions 170 and 195 with tyrosine and glutamic acid, respectively.

Different alterations. Where different alterations can be introduced at a position, the different alterations are separated by a comma, e.g., "Arg170Tyr, Glu" or "R170Y, E" represents a substitution of arginine at position 170 with tyrosine or glutamic acid. Thus, "Tyr167Gly, Ala+Arg170Gly, Ala" designates the following variants: "Tyr167Gly+Arg170Gly", "Tyr167Gly+Arg170Ala", "Tyr167Ala+Arg170Gly", and "Tyr167Ala+Arg170Ala".

DETAILED DESCRIPTION OF THE INVENTION

The present invention relates to detergent compositions capable of reducing odor generated by a lipase during cleaning or washing of laundry. The invention also relates to methods of cleaning or washing laundry using a detergent composition of the invention. In particular, the laundry is in need of cleaning or washing.

Detergent Compositions of the Invention

In the first aspect, the invention relates to detergent compositions capable of reducing odor generated by a lipase during cleaning or washing of laundry comprising:

(a) a surfactant or a surfactant or surfactant system;

(b) a lipase; and (c) ricinoleic acid, a ricinoleic salt, or a ricinoleic ester.

Composition Components

The non-limiting list of composition components illustrated hereinafter are suitable for use in the compositions and methods of the invention and may be desirably incorporated in certain embodiments of the invention, e.g., to assist or enhance cleaning performance, for treatment of the substrate to be cleaned, or to modify the aesthetics of the composition as is the case with perfumes, colorants, dyes or the like. The levels of any such components incorporated in any compositions are in addition to any materials previously recited for incorporation. The precise nature of these additional components, and levels of incorporation thereof, will depend on the physical form of the composition and the nature of the cleaning operation for which it is to be used. Although components mentioned below are categorized by general header according to a particular functionality, this is not to be construed as a limitation, as a component may comprise additional functionalities as will be appreciated by the skilled artisan.

Unless otherwise indicated the amounts in percentage is by weight of the composition (wt. %). Suitable component materials include, but are not limited to, surfactants, builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, fabric softeners, carriers, hydrotropes, processing aids, solvents and/or pigments. In addition to the disclosure below, suitable examples of such other components and levels of use are found in U.S. Pat. Nos. 5,576,282, 6,306,812, and 6,326,348 which are hereby incorporated by reference.

Thus, in certain embodiments the invention do not contain one or more of the following adjuncts materials: surfactants, soaps, builders, chelating agents, dye transfer inhibiting agents, dispersants, additional enzymes, enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, perfumes, perfume delivery systems, structure elasticizing agents, fabric softeners, carriers, hydrotropes, processing aids, solvents and/or pigments. However, when one or more components are present, such one or more components may be present as detailed below:

Surfactants or Surfactant Systems

The compositions according to the present invention comprise a surfactant or surfactant system. In an embodiment, the surfactant(s) can be selected from nonionic surfactants, anionic surfactants, cationic surfactants, ampholytic surfactants, zwitterionic surfactants, semi-polar nonionic surfactants and mixtures thereof.

The surfactant(s) is(are) typically present at a level of from 0.1 to 60 wt. %, from 0.2 to 40 wt. %, from 0.5 to 30 wt. %, from 1 to 50 wt. %, from 1 to 40 wt. %, from 1 to 30 wt. %, from 1 to 20 wt. %, from 3 to 10 wt. %, from 3 to 5 wt. %, from 5 to 40 wt. %, from 5 to 30 wt. %, from 5 to 15 wt. %, from 3 to 20 wt. %, from 3 to 10 wt. %, from 8 to 12 wt. %, from 10 to 12 wt. %, from 20 to 25 wt. % or from 25-60 wt. %.

Suitable anionic detersive surfactants include sulphate and sulphonate detersive surfactants.

Suitable sulphonate detersive surfactants include alkyl benzene sulphonate, in one aspect, $C_{10-13}$ alkyl benzene sulphonate. Suitable alkyl benzene sulphonate (LAS) may be obtained, by sulphonating commercially available linear alkyl benzene (LAB); suitable LAB includes low 2-phenyl LAB, such as Isochem® or Petrelab®, other suitable LAB include high 2-phenyl LAB, such as Hyblene®. A suitable anionic detersive surfactant is alkyl benzene sulphonate that is obtained by DETAL catalyzed process, although other synthesis routes, such as HF, may also be suitable. In one aspect a magnesium salt of LAS is used.

Suitable sulphate detersive surfactants include alkyl sulphate, in one aspect, $C_{8-18}$ alkyl sulphate, or predominantly $C_{12}$ alkyl sulphate.

Another suitable sulphate detersive surfactant is alkyl alkoxylated sulphate, in one aspect, alkyl ethoxylated sulphate, in one aspect, a $C_{8-18}$ alkyl alkoxylated sulphate, in another aspect, a $C_{8-18}$ alkyl ethoxylated sulphate, typically the alkyl alkoxylated sulphate has an average degree of alkoxylation of from 0.5 to 20, or from 0.5 to 10, typically the alkyl alkoxylated sulphate is a $C_{8-18}$ alkyl ethoxylated sulphate having an average degree of ethoxylation of from 0.5 to 10, from 0.5 to 7, from 0.5 to 5 or from 0.5 to 3.

The alkyl sulphate, alkyl alkoxylated sulphate and alkyl benzene sulphonates may be linear or branched, substituted or un-substituted.

The detersive surfactant may be a mid-chain branched detersive surfactant, in one aspect, a mid-chain branched anionic detersive surfactant, in one aspect, a mid-chain branched alkyl sulphate and/or a mid-chain branched alkyl benzene sulphonate, e.g., a mid-chain branched alkyl sulphate. In one aspect, the mid-chain branches are $C_{1-4}$ alkyl groups, typically methyl and/or ethyl groups.

Non-limiting examples of anionic surfactants include sulfates and sulfonates, in particular, linear alkylbenzenesulfonates (LAS), isomers of LAS, branched alkylbenzenesulfonates (BABS), phenylalkanesulfonates, alpha-olefinsulfonates (AOS), olefin sulfonates, alkene sulfonates, alkane-2,3-diylbis(sulfates), hydroxyalkanesulfonates and disulfonates, alkyl sulfates (AS) such as sodium dodecyl sulfate (SDS) or sodium lauryl sulfate (SLS), fatty alcohol sulfates (FAS), primary alcohol sulfates (PAS), alcohol ethersulfates (AES or AEOS or FES, also known as alcohol ethoxysulfates or fatty alcohol ether sulfates), sodium laureth sulfate (SLES), secondary alkanesulfonates (SAS), paraffin sulfonates (PS), ester sulfonates, sulfonated fatty acid glycerol esters, alpha-sulfo fatty acid methyl esters (alpha-SFMe or SES) including methyl ester sulfonate (MES), alkyl- or alkenylsuccinic acid, dodecenyl/tetradecenyl succinic acid (DTSA), fatty acid derivatives of amino acids, diesters and monoesters of sulfo-succinic acid or soap, and combinations thereof.

Suitable non-ionic detersive surfactants are selected from the group consisting of: $C_8$-$C_{18}$ alkyl ethoxylates, such as, NEODOL®; $C_6$-$C_{12}$ alkyl phenol alkoxylates wherein the alkoxylate units may be ethyleneoxy units, propyleneoxy units or a mixture thereof; $C_{12}$-$C_{18}$ alcohol and $C_6$-$C_{12}$ alkyl phenol condensates with ethylene oxide/propylene oxide block polymers such as Pluronic®; $C_{14}$-$C_{22}$ mid-chain branched alcohols; $C_{14}$-$C_{22}$ mid-chain branched alkyl alkoxylates, typically having an average degree of alkoxylation of from 1 to 30; alkylpolysaccharides, in one aspect, alkylpolyglycosides; polyhydroxy fatty acid amides; ether capped poly(oxyalkylated) alcohol surfactants; and mixtures thereof.

Suitable non-ionic detersive surfactants include alkyl polyglucoside and/or an alkyl alkoxylated alcohol.

In one aspect, non-ionic detersive surfactants include alkyl alkoxylated alcohols, in one aspect $C_{8-18}$ alkyl alkoxylated alcohol, e.g., a $C_{8-18}$ alkyl ethoxylated alcohol, the alkyl alkoxylated alcohol may have an average degree of alkoxylation of from 1 to 50, from 1 to 30, from 1 to 20, or from 1 to 10. In one aspect, the alkyl alkoxylated alcohol may be a $C_{8-18}$ alkyl ethoxylated alcohol having an average degree of ethoxylation of from 1 to 10, from 1 to 7, more from 1 to 5 or from 3 to 7. The alkyl alkoxylated alcohol can be linear or branched and substituted or un-substituted. Suitable nonionic surfactants include Lutensol®.

Non-limiting examples of nonionic surfactants include alcohol ethoxylates (AE or AEO), such as linear alcohol (C12-15) ethoxylate (LAE), alcohol propoxylates, propoxylated fatty alcohols (PFA), alkoxylated fatty acid alkyl esters, such as ethoxylated and/or propoxylated fatty acid alkyl esters, alkylphenol ethoxylates (APE), nonylphenol ethoxylates (NPE), alkylpolyglycosides (APG), alkoxylated amines, fatty acid monoethanolamides (FAM), fatty acid diethanolamides (FADA), ethoxylated fatty acid monoethanolamides (EFAM), propoxylated fatty acid monoethanolamides (PFAM), polyhydroxyalkyl fatty acid amides, or N-acyl N-alkyl derivatives of glucosamine (glucamides, GA, or fatty acid glucamides, FAGA), as well as products available under the trade names SPAN and TWEEN, and combinations thereof.

Suitable cationic detersive surfactants include alkyl pyridinium compounds, alkyl quaternary ammonium compounds, alkyl quaternary phosphonium compounds, alkyl ternary sulphonium compounds, and mixtures thereof.

Suitable cationic detersive surfactants are quaternary ammonium compounds having the general formula: $(R)(R_1)(R_2)(R_3)N^+ X^-$, wherein, R is a linear or branched, substituted or unsubstituted $C_{6-18}$ alkyl or alkenyl moiety, $R_1$ and $R_2$ are independently selected from methyl or ethyl moieties, $R_3$ is a hydroxyl, hydroxymethyl or a hydroxyethyl moiety, X is an anion which provides charge neutrality, suitable anions include: halides, e.g., chloride; sulphate; and sulphonate. Suitable cationic detersive surfactants are mono-$C_{6-18}$ alkyl mono-hydroxyethyl di-methyl quaternary ammonium chlorides. Highly suitable cationic detersive surfactants are mono-$C_{8-10}$ alkyl mono-hydroxyethyl di-methyl quaternary ammonium chloride, mono-$C_{10-12}$ alkyl mono-hydroxyethyl di-methyl quaternary ammonium chloride and mono-$C_{10}$ alkyl mono-hydroxyethyl di-methyl quaternary ammonium chloride.

Non-limiting examples of cationic surfactants include alkyldimethylethanolamine quat (ADMEAQ), cetyltrimethylammonium bromide (CTAB), dimethyldistearylammonium chloride (DSDMAC), and alkylbenzyldimethylammonium, alkyl quaternary ammonium compounds, alkoxylated quaternary ammonium (AQA) compounds, ester quats, and combinations thereof.

Suitable amphoteric/zwitterionic surfactants include amine oxides and betaines such as alkyldimethylbetaines, sulfobetaines, or combinations thereof. Amine-neutralized anionic surfactants—Anionic surfactants and adjunct anionic cosurfactants, may exist in an acid form, and said acid form may be neutralized to form a surfactant salt which is desirable for use in the present detergent compositions. Typical agents for neutralization include the metal counterion base such as hydroxides, e.g., NaOH or KOH. Further preferred agents for neutralizing anionic surfactants of the present invention and adjunct anionic surfactants or cosurfactants in their acid forms include ammonia, amines, or alkanolamines. Alkanolamines are preferred. Suitable non-limiting examples including monoethanolamine, diethanolamine, triethanolamine, and other linear or branched alkanolamines known in the art; e.g., highly preferred alkanolamines include 2-amino-1-propanol, 1-aminopropanol, monoisopropanolamine, or 1-amino-3-propanol. Amine neutralization may be done to a full or partial extent, e.g., part of the anionic surfactant mix may be neutralized with sodium or potassium and part of the anionic surfactant mix may be neutralized with amines or alkanolamines.

Non-limiting examples of semipolar surfactants include amine oxides (AO) such as alkyldimethylamineoxide Surfactant systems comprising mixtures of one or more anionic and in addition one or more nonionic surfactants optionally with an additional surfactant such as a cationic surfactant, may be preferred. Preferred weight ratios of anionic to nonionic surfactant are at least 2:1, or at least 1:1 to 1:10.

In one aspect a surfactant system may comprise a mixture of isoprenoid surfactants represented by formula A and formula B:

(A)

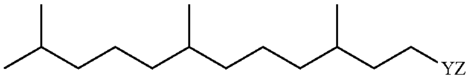

(A)

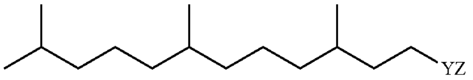

(B)

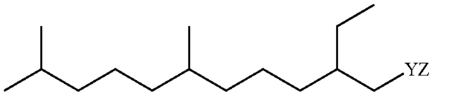

where Y is $CH_2$ or null, and Z may be chosen such that the resulting surfactant is selected from the following surfactants: an alkyl carboxylate surfactant, an alkyl polyalkoxy surfactant, an alkyl anionic polyalkoxy sulfate surfactant, an alkyl glycerol ester sulfonate surfactant, an alkyl dimethyl amine oxide surfactant, an alkyl polyhydroxy based surfactant, an alkyl phosphate ester surfactant, an alkyl glycerol sulfonate surfactant, an alkyl polygluconate surfactant, an alkyl polyphosphate ester surfactant, an alkyl phosphonate surfactant, an alkyl polyglycoside surfactant, an alkyl monoglycoside surfactant, an alkyl diglycoside surfactant, an alkyl sulfosuccinate surfactant, an alkyl disulfate surfactant, an alkyl disulfonate surfactant, an alkyl sulfosuccinamate surfactant, an alkyl glucamide surfactant, an alkyl taurinate surfactant, an alkyl sarcosinate surfactant, an alkyl glycinate surfactant, an alkyl isethionate surfactant, an alkyl dialkanolamide surfactant, an alkyl monoalkanolamide surfactant, an alkyl monoalkanolamide sulfate surfactant, an alkyl diglycolamide surfactant, an alkyl diglycolamide sulfate surfactant, an alkyl glycerol ester surfactant, an alkyl glycerol ester sulfate surfactant, an alkyl glycerol ether surfactant, an alkyl glycerol ether sulfate surfactant, alkyl methyl ester sulfonate surfactant, an alkyl polyglycerol ether surfactant, an alkyl polyglycerol ether sulfate surfactant, an alkyl sorbitan ester surfactant, an alkyl ammonioalkanesulfonate surfactant, an alkyl amidopropyl betaine surfactant, an alkyl allylated quat based surfactant, an alkyl monohydroxyalkyl-di-alkylated quat based surfactant, an alkyl di-hydroxyalkyl monoalkyl quat based surfactant, an alkylated quat surfactant, an alkyl trimethylammonium quat surfactant, an alkyl polyhydroxalkyl oxypropyl quat based surfactant, an alkyl glycerol ester quat surfactant, an alkyl glycol amine quat surfactant, an alkyl monomethyl dihydroxyethyl quaternary ammonium surfactant, an alkyl dimethyl monohydroxyethyl quaternary ammonium surfactant, an alkyl trimethylammonium surfactant, an alkyl imidazoline-based surfactant, an alken-2-yl-succinate surfactant, an alkyl a-sulfonated carboxylic acid surfactant, an alkyl a-sulfonated carboxylic acid alkyl ester surfactant, an alpha olefin sulfonate surfactant, an alkyl phenol ethoxylate surfactant, an alkyl benzenesulfonate surfactant, an alkyl sulfobetaine surfactant, an alkyl hydroxysulfobetaine surfactant, an alkyl ammoniocarboxylate betaine surfactant, an alkyl sucrose ester surfactant, an alkyl alkanolamide surfactant, an alkyl di(polyoxyethylene) monoalkyl ammonium surfactant, an alkyl mono(polyoxyethylene) dialkyl ammonium surfactant, an alkyl benzyl dimethylammonium surfactant, an alkyl aminopropionate surfactant, an alkyl amidopropyl dimethylamine surfactant, or a mixture thereof; and if Z is a charged moiety, Z is charge-balanced by a suitable metal or organic counter ion. Suitable counter ions include a metal counter ion, an amine, or an alkanolamine, e.g., C1-C6 alkanolammonium. More specifically, suitable counter ions include Na+, Ca+, Li+, K+, Mg+, e.g., monoethanolamine (MEA), diethanolamine (DEA), triethanolamine (TEA), 2-amino-1-propanol, 1-aminopropanol, methyldiethanolamine, dimethylethanolamine, monoisopropanolamine, triisopropanolamine, 1-amino-3-propanol, or mixtures thereof. In one embodiment, the compositions contain from 5% to 97% of one or more non-isoprenoid surfactants; and one or more adjunct cleaning additives; wherein the weight ratio of surfactant of formula A to surfactant of formula B is from 50:50 to 95:5.

In an embodiment, the composition of the invention comprises one or more anionic surfactant and/or one or more nonionic surfactant.

In a preferred embodiment, the composition of the invention comprises one or more anionic surfactants, preferably linear alkylbenzenesulfonic acid (LAS), alcohol ethersulfate (AEOS) and/or alkyl sulfate (AS), in particular, sodium lauryl sulfate (SLS).

In an embodiment the composition comprises one or more non-ionic surfactants, preferably alcohol ethoxylate (AEO), in particular, linear alcohol (C12-15) ethoxylate (LAE).

In a preferred embodiment, the composition comprises one or more anionic surfactants and one or more nonionic surfactants.

In a specific embodiment, the composition comprises the anionic surfactants LAS, SLES and SLS and the nonionic surfactant LAE.

In a specific embodiment, the composition comprises the anionic surfactants SLES and SLS and the nonionic surfactant AEO.

In a specific embodiment, the composition comprises the components in Model J detergent disclosed in Example 1.

In a specific embodiment, the composition comprises the components in Model E1 detergent disclosed in Example 2.

Soap

The compositions of the invention may also contain soap. Without being limited by theory, it may be desirable to include soap as it acts in part as a surfactant and in part as a builder and may be useful for suppression of foam and may furthermore interact favorably with the various cationic compounds of the composition to enhance softness on textile fabrics treaded with the inventive compositions. Any soap known in the art for use in laundry detergents may be utilized. In one embodiment, the compositions contain from 0 wt. % to 20 wt. %, from 0.5 wt. % to 20 wt. %, from 4 wt. % to 10 wt. %, or from 4 wt. % to 7 wt. % of soap.

Examples of soap useful herein include oleic acid soaps, palmitic acid soaps, palm kernel fatty acid soaps, and mixtures thereof. Typical soaps are in the form of mixtures of fatty acid soaps having different chain lengths and degrees of substitution. One such mixture is topped palm kernel fatty acid.

In one embodiment, the soap is selected from free fatty acid. In a preferred embodiment the composition comprises coco fatty acid. Other suitable fatty acids are saturated and/or unsaturated and can be obtained from natural sources such a plant or animal esters (e.g., palm kernel oil, palm oil, coconut oil, babassu oil, safflower oil, tall oil, castor oil, tallow and fish oils, grease, and mixtures thereof), or synthetically prepared (e.g., via the oxidation of petroleum or by hydrogenation of carbon monoxide via the Fisher Tropsch process).

Examples of suitable saturated fatty acids for use in the compositions of this invention include captic, lauric, myristic, palmitic, stearic, arachidic and behenic acid. Suitable unsaturated fatty acid species include: palmitoleic, oleic, linoleic, linolenic and ricinoleic acid. Examples of preferred fatty acids are saturated Cn fatty acid, saturated $Ci_2$-$Ci_4$ fatty acids, and saturated or unsaturated Cn to $Ci_8$ fatty acids, and mixtures thereof.

When present, the weight ratio of fabric softening cationic cosurfactant to fatty acid is preferably from about 1:3 to about 3:1, more preferably from about 1:1.5 to about 1.5:1, most preferably about 1:1.

Levels of soap and of nonsoap anionic surfactants herein are percentages by weight of the detergent composition, specified on an acid form basis. However, as is commonly understood in the art, anionic surfactants and soaps are in practice neutralized using sodium, potassium or alkanolammonium bases, such as sodium hydroxide or monoethanolamine.

Hydrotropes

The compositions of the present invention may also comprise one or more hydrotropes. A hydrotrope is a compound that solubilises hydrophobic compounds in aqueous solutions (or oppositely, polar substances in a non-polar environment). Typically, hydrotropes have both hydrophilic and a hydrophobic character (so-called amphiphilic properties as known from surfactants); however, the molecular structure of hydrotropes generally do not favor spontaneous self-aggregation, see, e.g., review by Hodgdon and Kaler, 2007, *Current Opinion in Colloid & Interface Science* 12: 121-128. Hydrotropes do not display a critical concentration above which self-aggregation occurs as found for surfactants and lipids forming miceller, lamellar or other well defined meso-phases. Instead, many hydrotropes show a continuous-type aggregation process where the sizes of aggregates grow as concentration increases. However, many hydrotropes alter the phase behavior, stability, and colloidal properties of systems containing substances of polar and non-polar character, including mixtures of water, oil, surfactants, and polymers. Hydrotropes are classically used across industries from pharma, personal care, food, to technical applications. Use of hydrotropes in detergent compositions allow for example more concentrated formulations of surfactants (as in the process of compacting liquid detergents by removing water) without inducing undesired phenomena such as phase separation or high viscosity.

The detergent composition of the invention may contain from 0 to 10 wt. %, such as from 0 to 5 wt. %, 0.5 to 5 wt. %, or from 3 to 5 wt. %, of a hydrotrope. Any hydrotrope known in the art for use in detergents may be utilized. Non-limiting examples of hydrotropes include sodium benzenesulfonate, sodium p-toluene sulfonate (STS), sodium xylene sulfonate (SXS), sodium cumene sulfonate (SCS), sodium cymene sulfonate, amine oxides, alcohols and polyglycolethers, sodium hydroxynaphthoate, sodium hydroxynaphthalene sulfonate, sodium ethylhexyl sulfate, and combinations thereof.

Builders

The compositions of the present invention may also comprise one or more builders, co-builders, builder systems or a mixture thereof. When a builder is used, the cleaning composition will typically comprise from 0 to 65 wt. %, at least 1 wt. %, from 2 to 60 wt. % or from 5 to 10 wt. % builder. In a dish wash cleaning composition, the level of builder is typically 40 to 65 wt. % or 50 to 65 wt. %. The composition may be substantially free of builder; substantially free means "no deliberately added" zeolite and/or phosphate. Typical zeolite builders include zeolite A, zeolite P and zeolite MAP. A typical phosphate builder is sodium tri-polyphosphate.

The builder and/or co-builder may particularly be a chelating agent that forms water-soluble complexes with Ca and Mg. Any builder and/or co-builder known in the art for use in detergents may be utilized. Non-limiting examples of builders include zeolites, diphosphates (pyrophosphates), triphosphates such as sodium triphosphate (STP or STPP), carbonates such as sodium carbonate, soluble silicates such as sodium metasilicate, layered silicates (e.g., SKS-6 from Hoechst), ethanolamines such as 2-aminoethan-1-ol (MEA), iminodiethanol (DEA) and 2,2',2"-nitrilotriethanol (TEA), and carboxymethylinulin (CMI), and combinations thereof.

The composition may include a co-builder alone, or in combination with a builder, e.g., a zeolite builder. Non-limiting examples of co-builders include homopolymers of polyacrylates or copolymers thereof, such as poly(acrylic acid) (PAA) or copoly(acrylic acid/maleic acid) (PAA/PMA). Further non-limiting examples include citrate, chelators such as aminocarboxylates, aminopolycarboxylates and phosphonates, and alkyl- or alkenylsuccinic acid. Additional specific examples include 2,2',2"-nitrilotriacetic acid (NTA), etheylenediaminetetraacetic acid (EDTA), diethylenetriaminepentaacetic acid (DTPA), iminodisuccinic acid (IDS), ethylenediamine-N,N'-disuccinic acid (EDDS), methylglycinediacetic acid (MGDA), glutamic acid-N,N-diacetic acid (GLDA), 1-hydroxyethane-1,1-diylbis(phosphonic acid) (HEDP), ethylenediaminetetrakis(methylene)tetrakis(phosphonic acid) (EDTMPA), diethylenetriaminepentakis(methylene)pentakis(phosphonic acid) (DTPMPA), N-(2-hydroxyethyl)iminodiacetic acid (EDG), aspartic acid-N-monoacetic acid (ASMA), aspartic acid-N,N-diacetic acid (ASDA), aspartic acid-N-monopropionic acid (ASMP), iminodisuccinic acid (IDA), N-(2-sulfomethyl) aspartic acid (SMAS), N-(2-sulfoethyl) aspartic acid (SEAS), N-(2-sulfomethyl) glutamic acid (SMGL), N-(2-sulfoethyl) glutamic acid (SEGL), N-methyliminodiacetic acid (MIDA), α-alanine-N,N-diacetic acid (α-ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA), N-(hydroxyethyl)-ethylidenediaminetriacetate (HEDTA), diethanolglycine (DEG), Diethylenetriamine Penta (Methylene Phosphonic acid) (DTPMP), aminotris(methylenephosphonic acid) (ATMP), and combinations and salts thereof. Further exemplary builders and/or co-builders are described in, e.g., WO 2009/102854, U.S. Pat. No. 5,977,053.

Chelating Agents and Crystal Growth Inhibitors

The compositions of the invention may also contain a chelating agent and/or a crystal growth inhibitor. Suitable molecules include copper, iron and/or manganese chelating agents and mixtures thereof. Suitable molecules include DTPA (Diethylene triamine pentaacetic acid), HEDP (Hydroxyethane diphosphonic acid), DTPMP (Diethylene triamine penta(methylene phosphonic acid)), 1,2-Dihydroxybenzene-3,5-disulfonic acid disodium salt hydrate, ethylenediamine, diethylene triamine, ethylenediaminedisuccinic acid (EDDS), N-hydroxyethylethylenediaminetriacetic acid (HEDTA), triethylenetetraaminehexaacetic acid (TTHA), N-hydroxyethyliminodiacetic acid (HEIDA), dihydroxyethylglycine (DHEG), ethylenediaminetetrapropionic acid (EDTP), carboxymethyl inulin and 2-Phosphonobutane 1,2,4-tricarboxylic acid (Bayhibit® AM) and derivatives thereof. Typically, the composition may comprise from 0.005 to 15 wt. % or from 3.0 to 10 wt. % chelating agent or crystal growth inhibitor.

Bleach Components

The composition of the invention may also comprise a bleach component. The bleach component suitable for incorporation in compositions of the invention or use in methods of the invention comprises one or a mixture of more than one bleach component. Suitable bleach components include bleaching catalysts, photobleaches, bleach activators, hydrogen peroxide, sources of hydrogen peroxide, pre-formed peracids and mixtures thereof. In general, when a bleach component is used, the compositions of the present invention may comprise from 0 to 30 wt. %, from 0.00001 to 90 wt. %, 0.0001 to 50 wt. %, from 0.001 to 25 wt. % or from 1 to 20 wt. %. Examples of suitable bleach components include:

(1) Pre-formed peracids: Suitable preformed peracids include, but are not limited to, compounds selected from the group consisting of pre-formed peroxyacids or salts thereof, typically either a peroxycarboxylic acid or salt thereof, or a peroxysulphonic acid or salt thereof.

The pre-formed peroxyacid or salt thereof is preferably a peroxycarboxylic acid or salt thereof, typically having a chemical structure corresponding to the following chemical formula:

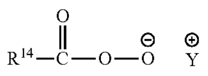

wherein: $R^{14}$ is selected from alkyl, aralkyl, cycloalkyl, aryl or heterocyclic groups; the $R^{14}$ group can be linear or branched, substituted or unsubstituted; and Y is any suitable counter-ion that achieves electric charge neutrality, preferably Y is selected from hydrogen, sodium or potassium. Preferably, $R^{14}$ is a linear or branched, substituted or unsubstituted $C_{6-9}$ alkyl. Preferably, the peroxyacid or salt thereof is selected from peroxyhexanoic acid, peroxyheptanoic acid, peroxyoctanoic acid, peroxynonanoic acid, peroxydecanoic acid, any salt thereof, or any combination thereof. Particularly preferred peroxyacids are phthalimido-peroxy-alkanoic acids, in particular ε-phthahlimido peroxy hexanoic acid (PAP). Preferably, the peroxyacid or salt thereof has a melting point in the range of from 30° C. to 60° C.

The pre-formed peroxyacid or salt thereof can also be a peroxysulphonic acid or salt thereof, typically having a chemical structure corresponding to the following chemical formula:

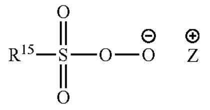

wherein: $R^{15}$ is selected from alkyl, aralkyl, cycloalkyl, aryl or heterocyclic groups; the $R^{15}$ group can be linear or branched, substituted or unsubstituted; and Z is any suitable counter-ion that achieves electric charge neutrality, preferably Z is selected from hydrogen, sodium or potassium. Preferably $R^{15}$ is a linear or branched, substituted or unsubstituted $C_{6-9}$ alkyl. Preferably such bleach components may be present in the compositions of the invention in an amount from 0.01 to 50 wt. % or from 0.1 to 20 wt. %.

(2) Sources of hydrogen peroxide include, e.g., inorganic perhydrate salts, including alkali metal salts such as sodium salts of perborate (usually mono- or tetra-hydrate), percarbonate, persulphate, perphosphate, persilicate salts and mixtures thereof. In one aspect of the invention the inorganic perhydrate salts such as those selected from the group consisting of sodium salts of perborate, percarbonate and mixtures thereof. When employed, inorganic perhydrate salts are typically present in amounts of 0.05 to 40 wt. % or 1 to 30 wt. % of the overall composition and are typically incorporated into such compositions as a crystalline solid that may be coated. Suitable coatings include inorganic salts such as alkali metal silicate, carbonate or borate salts or mixtures thereof, or organic materials such as water-soluble or dispersible polymers, waxes, oils or fatty soaps. Preferably such bleach components may be present in the compositions of the invention in an amount of 0.01 to 50 wt. % or 0.1 to 20 wt. %.

(3) The term bleach activator is meant herein as a compound which reacts with hydrogen peroxide to form a peracid via perhydrolysis. The peracid thus formed constitutes the activated bleach. Suitable bleach activators to be used herein include those belonging to the class of esters, amides, imides or anhydrides. Suitable bleach activators are those having R—(C═O)-L, wherein R is an alkyl group, optionally branched, having, when the bleach activator is hydrophobic, from 6 to 14 carbon atoms, or from 8 to 12 carbon atoms and, when the bleach activator is hydrophilic, less than 6 carbon atoms or less than 4 carbon atoms; and L is leaving group. Examples of suitable leaving groups are benzoic acid and derivatives thereof—especially benzene sulphonate. Suitable bleach activators include dodecanoyl oxybenzene sulphonate, decanoyl oxybenzene sulphonate, decanoyl oxybenzoic acid or salts thereof, 3,5,5-trimethyl hexanoyloxybenzene sulphonate, tetraacetyl ethylene diamine (TAED), sodium 4-[(3,5,5-trimethylhexanoyl)oxy]benzene-1-sulfonate (ISONOBS), 4-(dodecanoyloxy)benzene-1-sulfonate (LOBS), 4-(decanoyloxy)benzene-1-sulfonate, 4-(decanoyloxy)benzoate (DOBS or DOBA), 4-(nonanoyloxy)benzene-1-sulfonate (NOBS), and/or those disclosed in WO 98/17767. A family of bleach activators is disclosed in EP624154 and particularly preferred in that family is acetyl triethyl citrate (ATC). ATC or a short chain triglyceride like triacetin has the advantage that it is environmentally friendly. Furthermore, acetyl triethyl citrate and triacetin have good hydrolytical stability in the product upon storage and are efficient bleach activators. Finally, ATC is multifunctional, as the citrate released in the perhydrolysis reaction may function as a builder. Alternatively, the bleaching system may comprise peroxyacids of, for example, the amide, imide, or sulfone type. The bleaching system may also comprise peracids such as 6-(phthalimido)peroxyhexanoic acid (PAP). Suitable bleach activators are also disclosed in WO 98/17767. While any suitable bleach activator may be employed, in one aspect of the invention the subject cleaning composition may comprise NOBS, TAED or mixtures thereof. When present, the peracid and/or bleach activator is generally present in the composition in an amount of 0.1 to 60 wt. %, 0.5 to 40 wt. % or 0.6 to 10 wt. % based on the fabric and home care composition. One or more hydrophobic peracids or precursors thereof may be used in combination with one or more hydrophilic peracid or precursor thereof. Preferably such bleach components may be present in the compositions of the invention in an amount of 0.01 to 50 wt. %, or 0.1 to 20 wt. %.

The amounts of hydrogen peroxide source and peracid or bleach activator may be selected such that the molar ratio of available oxygen (from the peroxide source) to peracid is from 1:1 to 35:1, or even 2:1 to 10:1.

(4) Diacyl peroxides—preferred diacyl peroxide bleaching species include those selected from diacyl peroxides of the general formula: $R^1$—C(O)—OO—(O)C—$R^2$, in which $R^1$ represents a $C_6$-$C_{18}$ alkyl, preferably $C_6$-$C_{12}$ alkyl group containing a linear chain of at least 5 carbon atoms and optionally containing one or more substituents (e.g., —$N^+(CH_3)_3$, —COOH or —CN) and/or one or more interrupting moieties (e.g., —CONH— or —CH═CH—) interpolated between adjacent carbon atoms of the alkyl radical, and $R^2$ represents an aliphatic group compatible with a peroxide moiety, such that $R^1$ and $R^2$ together contain a total of 8 to 30 carbon atoms. In one preferred aspect $R^1$ and $R^2$ are linear unsubstituted $C_6$-$C_{12}$ alkyl chains. Most preferably $R^1$ and $R^2$ are identical. Diacyl peroxides, in which both $R^1$ and $R^2$ are $C_6$-$C_{12}$ alkyl groups, are particularly preferred. Preferably, at least one of, most preferably only one of, the R groups ($R_1$ or $R_2$), does not contain branching or pendant rings in the alpha position, or preferably neither in the alpha nor beta positions or most preferably in none of the alpha or beta or gamma positions. In one further preferred embodiment the DAP may be asymmetric, such that preferably the hydrolysis of R1 acyl group is rapid to generate peracid, but the hydrolysis of R2 acyl group is slow.

The tetraacyl peroxide bleaching species is preferably selected from tetraacyl peroxides of the general formula: $R^3$—C(O)—OO—C(O)—$(CH_2)$n-C(O)—OO—C(O)—$R^3$, in which $R^3$ represents a $C_1$-$C_9$ alkyl, or $C_3$-$C_7$ group and n represents an integer from 2 to 12, or 4 to 10 inclusive.

Preferably, the diacyl and/or tetraacyl peroxide bleaching species is present in an amount sufficient to provide at least 0.5 ppm, at least 10 ppm, or at least 50 ppm by weight of the wash liquor. In a preferred embodiment, the bleaching species is present in an amount sufficient to provide from 0.5 to 300 ppm, from 30 to 150 ppm by weight of the wash liquor.

Preferably the bleach component comprises a bleach catalyst (5 and 6).

(5) Preferred are organic (non-metal) bleach catalysts include bleach catalyst capable of accepting an oxygen atom from a peroxyacid and/or salt thereof and transferring the oxygen atom to an oxidizeable substrate. Suitable bleach catalysts include but are not limited to: iminium cations and polyions; iminium zwitterions; modified amines; modified amine oxides; N-sulphonyl imines; N-phosphonyl imines; N-acyl imines; thiadiazole dioxides; perfluoroimines; cyclic sugar ketones and mixtures thereof.

Suitable iminium cations and polyions include, but are not limited to, N-methyl-3,4-dihydroisoquinolinium tetrafluoroborate, prepared as described in *Tetrahedron* 49(2): 423-38 (1992) (e.g., compound 4, p. 433); N-methyl-3,4-dihydroisoquinolinium p-toluene sulphonate, prepared as described in U.S. Pat. No. 5,360,569 (e.g., Column 11, Example 1); and N-octyl-3,4-dihydroisoquinolinium p-toluene sulphonate, prepared as described in U.S. Pat. No. 5,360,568 (e.g., Column 10, Ex. 3).

Suitable iminium zwitterions include, but are not limited to, N-(3-sulfopropyl)-3,4-dihydroisoquinolinium, inner salt, prepared as described in U.S. Pat. No. 5,576,282 (e.g., Column 31, Ex. II); N-[2-(sulphooxy)dodecyl]-3,4-dihydroisoquinolinium, inner salt, prepared as described in U.S. Pat. No. 5,817,614 (e.g., Column 32, Ex. V); 2-[3-[(2-ethylhexyl)oxy]-2-(sulphooxy)propyl]-3,4-dihydroisoquinolinium, inner salt, prepared as described in WO 2005/047264 (e.g., p. 18, Ex. 8), and 2-[3-[(2-butyloctyl)oxy]-2-(sulphooxy)propyl]-3,4-dihydroisoquinolinium, inner salt.

Suitable modified amine oxygen transfer catalysts include, but are not limited to, 1,2,3,4-tetrahydro-2-methyl-1-isoquinolinol, which can be made according to the procedures described in *Tetrahedron Letters* 28(48): 6061-6064 (1987). Suitable modified amine oxide oxygen transfer catalysts include, but are not limited to, sodium 1-hydroxy-N-oxy-N-[2-(sulphooxy)decyl]-1,2,3,4-tetrahydroisoquinoline.

Suitable N-sulphonyl imine oxygen transfer catalysts include, but are not limited to, 3-methyl-1,2-benzisothiazole 1,1-dioxide, prepared according to the procedure described in the *Journal of Organic Chemistry* 55(4): 1254-61 (1990).

Suitable N-phosphonyl imine oxygen transfer catalysts include, but are not limited to, [R-(E)]-N-[(2-chloro-5-nitrophenyl)methylene]-P-phenyl-P-(2,4,6-trimethylphenyl)-phosphinic amide, which can be made according to the procedures described in the *Journal of the Chemical Society, Chemical Communications* (22): 2569-2570 (1994).

Suitable N-acyl imine oxygen transfer catalysts include, but are not limited to, [N(E)]-N-(phenylmethylene)acetamide, which can be made according to the procedures described in the *Polish Journal of Organic Chemistry* 77(5): 577-590 (2003).

Suitable thiadiazole dioxide oxygen transfer catalysts include but are not limited to, 3-methyl-4-phenyl-1,2,5-thiadiazole 1,1-dioxide, which can be made according to the procedures described in U.S. Pat. No. 5,753,599 (Column 9, Ex. 2).

Suitable perfluoroimine oxygen transfer catalysts include, but are not limited to, (Z)-2,2,3,3,4,4,4-heptafluoro-N-(nonafluorobutyl)butanimidoyl fluoride, which can be made according to the procedures described in *Tetrahedron Letters* 35(34): 6329-6330 (1994).

Suitable cyclic sugar ketone oxygen transfer catalysts include, but are not limited to, 1,2:4,5-di-O-isopropylidene-D-erythro-2,3-hexodiuro-2,6-pyranose as prepared in U.S. Pat. No. 6,649,085 (Column 12, Ex. 1).

Preferably, the bleach catalyst comprises an iminium and/or carbonyl functional group and is typically capable of forming an oxaziridinium and/or dioxirane functional group upon acceptance of an oxygen atom, especially upon acceptance of an oxygen atom from a peroxyacid and/or salt thereof. Preferably, the bleach catalyst comprises an oxaziridinium functional group and/or is capable of forming an oxaziridinium functional group upon acceptance of an oxygen atom, especially upon acceptance of an oxygen atom from a peroxyacid and/or salt thereof. Preferably, the bleach catalyst comprises a cyclic iminium functional group, preferably wherein the cyclic moiety has a ring size of from five to eight atoms (including the nitrogen atom), preferably six atoms. Preferably, the bleach catalyst comprises an aryliminium functional group, preferably a bi-cyclic aryliminium functional group, preferably a 3,4-dihydroisoquinolinium functional group. Typically, the imine functional group is a quaternary imine functional group and is typically capable of forming a quaternary oxaziridinium functional group upon acceptance of an oxygen atom, especially upon acceptance of an oxygen atom from a peroxyacid and/or salt thereof. In another aspect, the detergent composition comprises a bleach component having a log $P_{o/w}$ no greater than 0, no greater than −0.5, no greater than −1.0, no greater than −1.5, no greater than −2.0, no greater than −2.5, no greater than −3.0, or no greater than −3.5. The method for determining log $P_{o/w}$ is described in more detail below.

Typically, the bleach ingredient is capable of generating a bleaching species having a $X_{SO}$ of from 0.01 to 0.30, from 0.05 to 0.25, or from 0.10 to 0.20. The method for determining $X_{SO}$ is described in more detail below. For example, bleaching ingredients having an isoquinolinium structure are capable of generating a bleaching species that has an oxaziridinium structure. In this example, the $X_{SO}$ is that of the oxaziridinium bleaching species.

Preferably, the bleach catalyst has a chemical structure corresponding to the following chemical formula:

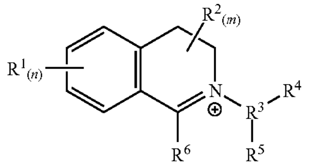

X wherein: n and m are independently from 0 to 4, preferably n and m are both 0; each $R^1$ is independently selected from a substituted or unsubstituted radical selected from the group consisting of hydrogen, alkyl, cycloalkyl, aryl, fused aryl, heterocyclic ring, fused heterocyclic ring, nitro, halo, cyano, sulphonato, alkoxy, keto, carboxylic, and carboalkoxy radicals; and any two vicinal $R^1$ substituents may combine to form a fused aryl, fused carbocyclic or fused heterocyclic ring; each $R^2$ is independently selected from a substituted or unsubstituted radical independently selected from the group consisting of hydrogen, hydroxy, alkyl, cycloalkyl, alkaryl, aryl, aralkyl, alkylenes, heterocyclic ring, alkoxys, arylcarbonyl groups, carboxyalkyl groups and amide groups; any $R^2$ may be joined together with any other of $R^2$ to form part of a common ring; any geminal $R^2$ may combine to form a carbonyl; and any two $R^2$ may combine to form a substituted or unsubstituted fused unsaturated moiety; $R^3$ is a $C_1$ to $C_{20}$ substituted or unsubstituted alkyl; $R^4$ is hydrogen or the moiety $Q_t$-A, wherein: Q is a branched or unbranched alkylene, t=0 or 1 and A is an anionic group selected from the group consisting of $OSO_3^-$, $SO_3^-$, $CO_2^-$, $OCO_2^-$, $OPO_3^{2-}$, $OPO_3H^-$ and $OPO_2^-$; $R^5$ is hydrogen or the moiety—$CR^{11}R^{12}$—Y-$G_b$-$Y_c$-[$(CR^9R^{10})_y$—O]$_k$—$R^8$, wherein: each Y is independently selected from the group consisting of O, S, N—H, or N—$R^8$; and each $R^8$ is independently selected from the group consisting of alkyl, aryl and heteroaryl, said moieties being substituted or unsubstituted, and whether substituted or unsubstituted said moieties having less than 21 carbons; each G is independently selected from the group consisting of CO, $SO_2$, SO, PO and $PO_2$; $R^9$ and $R^{10}$ are independently selected from the group consisting of H and $C_1$-$C_4$ alkyl; $R^{11}$ and $R^{12}$ are independently selected from the group consisting of H and alkyl, or when taken together may join to form a carbonyl; b=0 or 1; c=0 or 1, but c must=0 if b=0; y is an integer from 1 to 6; k is an integer from 0 to 20; $R^6$ is H, or an alkyl, aryl or heteroaryl moiety; said moieties being substituted or unsubstituted; and X, if present, is a suitable charge balancing counterion, preferably X is present when $R^4$ is hydrogen, suitable X, include but are not limited to: chloride, bromide, sulphate, methosulphate, sulphonate, p-toluenesulphonate, borontetraflouride and phosphate.

In one embodiment of the present invention, the bleach catalyst has a structure corresponding to general formula below: 0.0

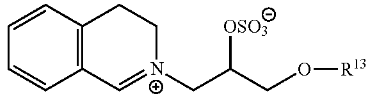

wherein $R^{13}$ is a branched alkyl group containing from three to 24 carbon atoms (including the branching carbon atoms) or a linear alkyl group containing from one to 24 carbon atoms; preferably $R^{13}$ is a branched alkyl group containing from eight to 18 carbon atoms or linear alkyl group containing from eight to eighteen carbon atoms; preferably $R^{13}$ is selected from the group consisting of 2-propylheptyl, 2-butyloctyl, 2-pentylnonyl, 2-hexyldecyl, n-dodecyl, n-tetradecyl, n-hexadecyl, n-octadecyl, iso-nonyl, iso-decyl, iso-tridecyl and iso-pentadecyl; preferably $R^{13}$ is selected from the group consisting of 2-butyloctyl, 2-pentylnonyl, 2-hexyldecyl, iso-tridecyl and iso-pentadecyl.

Preferably the bleach component comprises a source of peracid in addition to bleach catalyst, particularly organic bleach catalyst. The source of peracid may be selected from (a) pre-formed peracid; (b) percarbonate, perborate or persulfate salt (hydrogen peroxide source) preferably in combination with a bleach activator; and (c) perhydrolase enzyme and an ester for forming peracid in situ in the presence of water in a textile or hard surface treatment step.

When present, the peracid and/or bleach activator is generally present in the composition in an amount of from 0.1 to 60 wt. %, from 0.5 to 40 wt. % or from 0.6 to 10 wt. % based on the composition. One or more hydrophobic peracids or precursors thereof may be used in combination with one or more hydrophilic peracid or precursor thereof.

The amounts of hydrogen peroxide source and peracid or bleach activator may be selected such that the molar ratio of available oxygen (from the peroxide source) to peracid is from 1:1 to 35:1, or 2:1 to 10:1.

(6) Metal-containing Bleach Catalysts—The bleach component may be provided by a catalytic metal complex. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra(methylenephosphonic acid) and water-soluble salts thereof. Such catalysts are disclosed in U.S. Pat. No. 4,430,243. Preferred catalysts are described in WO 2009/839406, U.S. Pat. No. 6,218,351 and WO 00/12667. Particularly preferred are transition metal catalyst or ligands therefore that are cross-bridged polydentate N-donor ligands.

If desired, the compositions herein can be catalyzed by means of a manganese compound. Such compounds and levels of use are well known in the art and include, e.g., the manganese-based catalysts disclosed in U.S. Pat. No. 5,576,282.

Cobalt bleach catalysts useful herein are known, and are described, e.g., in U.S. Pat. Nos. 5,597,936; 5,595,967. Such cobalt catalysts are readily prepared by known procedures, such as taught, e.g., in U.S. Pat. Nos. 5,597,936 and 5,595,967.

Compositions herein may also suitably include a transition metal complex of ligands such as bispidones (U.S. Pat. No. 7,501,389) and/or macropolycyclic rigid ligands—abbreviated as "MRLs". As a practical matter, and not by way of limitation, the compositions and processes herein can be adjusted to provide on the order of at least one part per hundred million of the active MRL species in the aqueous washing medium, and will typically provide from 0.005 to 25 ppm, from 0.05 to 10 ppm, or from 0.1 to 5 ppm, of the MRL in the wash liquor.

Suitable transition-metals in the instant transition-metal bleach catalyst include, e.g., manganese, iron and chromium. Suitable MRLs include 5,12-diethyl-1,5,8,12-tetraazabicyclo[6.6.2]hexadecane. Suitable transition metal MRLs are readily prepared by known procedures, such as taught, e.g., in U.S. Pat. No. 6,225,464 and WO 00/32601.

(7) Photobleaches—suitable photobleaches include, e.g., sulfonated zinc phthalocyanine sulfonated aluminium phthalocyanines, xanthene dyes and mixtures thereof. Preferred bleach components for use in the present compositions of the invention comprise a hydrogen peroxide source, bleach activator and/or organic peroxyacid, optionally generated in situ by the reaction of a hydrogen peroxide source and bleach activator, in combination with a bleach catalyst. Preferred bleach components comprise bleach catalysts, preferably organic bleach catalysts, as described above.

Particularly preferred bleach components are the bleach catalysts in particular the organic bleach catalysts.

Exemplary bleaching systems are also described, e.g., in WO 2007/087258, WO 2007/087244, WO 2007/087259 and WO 2007/087242.

Fabric Hueing Agents

The composition of the invention may also comprise a fabric hueing agent. Suitable fabric hueing agents include dyes, dye-clay conjugates, and pigments. Suitable dyes include small molecule dyes and polymeric dyes. Suitable small molecule dyes include small molecule dyes selected from the group consisting of dyes falling into the Color Index (C.I.) classifications of Direct Blue, Direct Red, Direct Violet, Acid Blue, Acid Red, Acid Violet, Basic Blue, Basic Violet and Basic Red, or mixtures thereof.

In another aspect, suitable small molecule dyes include small molecule dyes selected from the group consisting of Color Index (Society of Dyers and Colorists, Bradford, UK) numbers Direct Violet 9, Direct Violet 35, Direct Violet 48, Direct Violet 51, Direct Violet 66, Direct Violet 99, Direct Blue 1, Direct Blue 71, Direct Blue 80, Direct Blue 279, Acid Red 17, Acid Red 73, Acid Red 88, Acid Red 150, Acid Violet 15, Acid Violet 17, Acid Violet 24, Acid Violet 43, Acid Red 52, Acid Violet 49, Acid Violet 50, Acid Blue 15, Acid Blue 17, Acid Blue 25, Acid Blue 29, Acid Blue 40, Acid Blue 45, Acid Blue 75, Acid Blue 80, Acid Blue 83, Acid Blue 90 and Acid Blue 113, Acid Black 1, Basic Violet 1, Basic Violet 3, Basic Violet 4, Basic Violet 10, Basic Violet 35, Basic Blue 3, Basic Blue 16, Basic Blue 22, Basic Blue 47, Basic Blue 66, Basic Blue 75, Basic Blue 159 and mixtures thereof. In another aspect, suitable small molecule dyes include small molecule dyes selected from the group consisting of Color Index (Society of Dyers and Colorists, Bradford, UK) numbers Acid Violet 17, Acid Violet 43, Acid Red 52, Acid Red 73, Acid Red 88, Acid Red 150, Acid Blue 25, Acid Blue 29, Acid Blue 45, Acid Blue 113, Acid Black 1, Direct Blue 1, Direct Blue 71, Direct Violet 51 and mixtures thereof. In another aspect, suitable small molecule dyes include small molecule dyes selected from the group consisting of Color Index (Society of Dyers and Colorists, Bradford, UK) numbers Acid Violet 17, Direct Blue 71, Direct Violet 51, Direct Blue 1, Acid Red 88, Acid Red 150, Acid Blue 29, Acid Blue 113 or mixtures thereof.

Suitable polymeric dyes include polymeric dyes selected from the group consisting of polymers containing conjugated chromogens (dye-polymer conjugates) and polymers with chromogens co-polymerized into the backbone of the polymer and mixtures thereof.

In another aspect, suitable polymeric dyes include polymeric dyes selected from the group consisting of fabric-substantive colorants sold under the name of Liquitint® (Milliken), dye-polymer conjugates formed from at least one reactive dye and a polymer selected from the group consisting of polymers comprising a moiety selected from the group consisting of a hydroxyl moiety, a primary amine moiety, a secondary amine moiety, a thiol moiety and mixtures thereof. In still another aspect, suitable polymeric dyes include polymeric dyes selected from the group consisting of Liquitint® Violet CT, carboxymethyl cellulose (CMC) conjugated with a reactive blue, reactive violet or reactive red dye such as CMC conjugated with C.I. Reactive Blue 19, sold by Megazyme, Wicklow, Ireland under the product name AZO-CM-CELLULOSE, product code S-ACMC, alkoxylated triphenyl-methane polymeric colorants, alkoxylated thiophene polymeric colorants, and mixtures thereof.

Preferred hueing dyes include the whitening agents found in WO 2008/087497. These whitening agents may be characterized by the following structure (1):

(I)

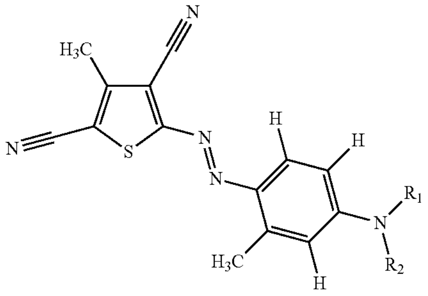

wherein $R_1$ and $R_2$ can independently be selected from:

a) $[(CH_2CR'HO)_x(CH_2CR''HO)_yH]$ wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_z$ H, and mixtures thereof; wherein x+y≤5; wherein y 1; and wherein z=0 to 5;

b) $R_1$=alkyl, aryl or aryl alkyl and $R_2$=$[(CH_2CR'HO)_x(CH_2CR''HO)_yH]$ wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_zH$, and mixtures thereof; wherein x+y≤10; wherein y 1; and wherein z=0 to 5;

c) R, =$[CH_2CH_2(OR_3)CH_2OR_4]$ and $R_2$=$[CH_2CH_2(OR_3)CH_2O R_4]$ wherein $R_3$ is selected from the group consisting of H, $(CH_2CH_2O)_zH$, and mixtures thereof; and wherein z=0 to 10; wherein $R_4$ is selected from the group consisting of ($C_1$-$C_1$s)alkyl, aryl groups, and mixtures thereof; and d) wherein R1 and R2 can independently be selected from the amino addition product of styrene oxide, glycidyl methyl ether, isobutyl glycidyl ether, isopropylglycidyl ether, t-butyl glycidyl ether, 2-ethylhexylgycidyl ether, and glycidylhexadecyl ether, followed by the addition of from 1 to 10 alkylene oxide units.

A preferred whitening agent of the present invention may be characterized by the following structure (II):

(II)

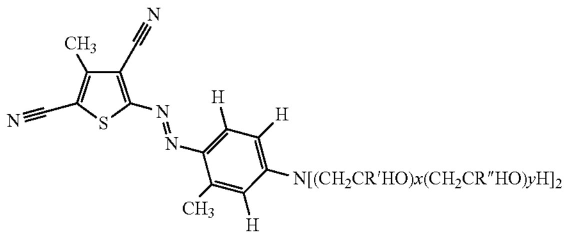

wherein R' is selected from the group consisting of H, $CH_3$, $CH_2O(CH_2CH_2O)_zH$, and mixtures thereof; wherein R" is selected from the group consisting of H, $CH_2O(CH_2CH_2O)_z$ H, and mixtures thereof; wherein x+y≤5; wherein y 1; and wherein z=0 to 5.

A further preferred whitening agent of the present invention may be characterized by the following structure (Ill):

(III)

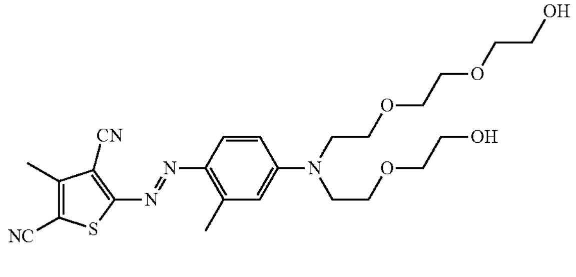

typically comprising a mixture having a total of 5 EO groups. Suitable preferred molecules are those in Structure I having the following pendant groups in "part a" above.

TABLE 1

| | R1 | | | | R2 | | | |
|---|---|---|---|---|---|---|---|---|
| | R' | R" | X | y | R' | R" | x | y |
| A | H | H | 3 | 1 | H | H | 0 | 1 |
| B | H | H | 2 | 1 | H | H | 1 | 1 |

TABLE 1-continued

| | R1 R' | R" | X | y | R2 R' | R" | x | y |
|---|---|---|---|---|---|---|---|---|
| c = b | H | H | 1 | 1 | H | H | 2 | 1 |
| d = a | H | H | 0 | 1 | H | H | 3 | 1 |

Further whitening agents of use include those described in US 2008/0034511 (Unilever). A preferred agent is "Violet 13".

Suitable dye clay conjugates include dye clay conjugates selected from the group comprising at least one cationic/basic dye and a smectite clay, and mixtures thereof. In another aspect, suitable dye clay conjugates include dye clay conjugates selected from the group consisting of one cationic/basic dye selected from the group consisting of C.I. Basic Yellow 1 through 108, C.I. Basic Orange 1 through 69, C.I. Basic Red 1 through 118, C.I. Basic Violet 1 through 51, C.I. Basic Blue 1 through 164, C.I. Basic Green 1 through 14, C.I. Basic Brown 1 through 23, Cl Basic Black 1 through 11, and a clay selected from the group consisting of Montmorillonite clay, Hectorite clay, Saponite clay and mixtures thereof. In still another aspect, suitable dye clay conjugates include dye clay conjugates selected from the group consisting of: Montmorillonite Basic Blue B7 C.I. 42595 conjugate, Montmorillonite Basic Blue B9 C.I. 52015 conjugate, Montmorillonite Basic Violet V3 C.I. 42555 conjugate, Montmorillonite Basic Green G1 C.I. 42040 conjugate, Montmorillonite Basic Red R1 C.I. 45160 conjugate, Montmorillonite C.I. Basic Black 2 conjugate, Hectorite Basic Blue B7 C.I 42595 conjugate, Hectorite Basic Blue B9 C.I. 52015 conjugate, Hectorite Basic Violet V3 C.I. 42555 conjugate, Hectorite Basic Green G1 C.I. 42040 conjugate, Hectorite Basic Red R1 C.I. 45160 conjugate, Hectorite C.I. Basic Black 2 conjugate, Saponite Basic Blue B7 C.I. 42595 conjugate, Saponite Basic Blue B9 C.I. 52015 conjugate, Saponite Basic Violet V3 C.I. 42555 conjugate, Saponite Basic Green G1 C.I. 42040 conjugate, Saponite Basic Red R1 C.I. 45160 conjugate, Saponite C.I. Basic Black 2 conjugate and mixtures thereof.

Suitable pigments include pigments selected from the group consisting of flavanthrone, indanthrone, chlorinated indanthrone containing from 1 to 4 chlorine atoms, pyranthrone, dichloropyranthrone, monobromodichloropyranthrone, dibromodichloropyranthrone, tetrabromopyranthrone, perylene-3,4,9,10-tetracarboxylic acid diimide, wherein the imide groups may be unsubstituted or substituted by C1-C3-alkyl or a phenyl or heterocyclic radical, and wherein the phenyl and heterocyclic radicals may additionally carry substituents which do not confer solubility in water, anthrapyrimidinecarboxylic acid amides, violanthrone, isoviolanthrone, dioxazine pigments, copper phthalocyanine which may contain up to 2 chlorine atoms per molecule, polychloro-copper phthalocyanine or polybromochloro-copper phthalocyanine containing up to 14 bromine atoms per molecule and mixtures thereof.

In another aspect, suitable pigments include pigments selected from the group consisting of Ultramarine Blue (C.I. Pigment Blue 29), Ultramarine Violet (C.I. Pigment Violet 15) and mixtures thereof.

The aforementioned fabric hueing agents can be used in combination (any mixture of fabric hueing agents can be used). Suitable hueing agents are described in more detail in U.S. Pat. No. 7,208,459. Preferred levels of dye in compositions of the invention are 0.00001 to 0.5 wt. %, or 0.0001 to 0.25 wt. %. The concentration of dyes preferred in water for the treatment and/or cleaning step is from 1 ppb to 5 ppm, 10 ppb to 5 ppm or 20 ppb to 5 ppm. In preferred compositions, the concentration of surfactant will be from 0.2 to 3 g/l.

Encapsulates

The composition of the invention may comprise an encapsulate comprising a core and a shell having an inner and outer surface. Said shell encapsulates said core.

In one aspect, of said encapsulate, said core may comprise a material selected from the group consisting of perfumes; brighteners; dyes; insect repellants; silicones; waxes; flavors; vitamins; fabric softening agents; skin care agents in one aspect, paraffins; enzymes; anti-bacterial agents; bleaches; sensates; and mixtures thereof; and said shell may comprise a material selected from the group consisting of polyethylenes; polyamides; polyvinylalcohols, optionally containing other co-monomers; polystyrenes; polyisoprenes; polycarbonates; polyesters; polyacrylates; aminoplasts, in one aspect said aminoplast may comprise a polyureas, polyurethane, and/or polyureaurethane, in one aspect said polyurea may comprise polyoxymethyleneurea and/or melamine formaldehyde; polyolefins; polysaccharides, in one aspect said polysaccharide may comprise alginate and/or chitosan; gelatin; shellac; epoxy resins; vinyl polymers; water insoluble inorganics; silicone; and mixtures thereof.

In one aspect of said encapsulate, said core may comprise perfume.

In one aspect of said encapsulate, said shell may comprise melamine formaldehyde and/or cross-linked melamine formaldehyde.

In a one aspect, suitable encapsulates may comprise a core material and a shell, said shell at least partially surrounding said core material, is disclosed. At least 75%, 85% or 90% of said encapsulates may have a fracture strength of from 0.2 to 10 MPa, from 0.4 to 5 MPa, from 0.6 to 3.5 MPa, or from 0.7 to 3 MPa; and a benefit agent leakage of from 0 to 30%, from 0 to 20%, or from 0 to 5%.

In one aspect, at least 75%, 85% or 90% of said encapsulates may have a particle size from 1 to 80 microns, from 5 to 60 microns, from 10 to 50 microns, or from 15 to 40 microns.

In one aspect, at least 75%, 85% or 90% of said encapsulates may have a particle wall thickness from 30 to 250 nm, from 80 to 180 nm, or from 100 to 160 nm.

In one aspect, said encapsulates' core material may comprise a material selected from the group consisting of a perfume raw material and/or optionally a material selected from the group consisting of vegetable oil, including neat and/or blended vegetable oils including castor oil, coconut oil, cottonseed oil, grape oil, rapeseed, soybean oil, corn oil, palm oil, linseed oil, safflower oil, olive oil, peanut oil, coconut oil, palm kernel oil, castor oil, lemon oil and mixtures thereof; esters of vegetable oils, esters, including dibutyl adipate, dibutyl phthalate, butyl benzyl adipate, benzyl octyl adipate, tricresyl phosphate, trioctyl phosphate and mixtures thereof; straight or branched chain hydrocarbons, including those straight or branched chain hydrocarbons having a boiling point of greater than about 80° C.; partially hydrogenated terphenyls, dialkyl phthalates, alkyl biphenyls, including monoisopropylbiphenyl, alkylated naphthalene, including dipropylnaphthalene, petroleum spirits, including kerosene, mineral oil and mixtures thereof; aromatic solvents, including benzene, toluene and mixtures thereof; silicone oils; and mixtures thereof.

In one aspect, said encapsulates' wall material may comprise a suitable resin including the reaction product of an aldehyde and an amine, suitable aldehydes include, formaldehyde. Suitable amines include melamine, urea, benzoguanamine, glycoluril, and mixtures thereof. Suitable melamines include methylol melamine, methylated methylol melamine, imino melamine and mixtures thereof. Suitable ureas include dimethylol urea, methylated dimethylol urea, urea-resorcinol, and mixtures thereof.

In one aspect, suitable formaldehyde scavengers may be employed with the encapsulates, e.g., in a capsule slurry and/or added to a composition before, during or after the encapsulates are added to such composition. Suitable capsules may be made by the following teaching of US 2008/0305982; and/or US 2009/0247449.

In a preferred aspect the composition can also comprise a deposition aid, preferably consisting of the group comprising cationic or nonionic polymers. Suitable polymers include cationic starches, cationic hydroxyethylcellulose, polyvinylformaldehyde, locust bean gum, mannans, xyloglucans, tamarind gum, polyethyleneterephthalate and polymers containing dimethylaminoethyl methacrylate, optionally with one or monomers selected from the group comprising acrylic acid and acrylamide.

Perfumes

In one aspect, the composition of the invention also comprises a perfume that comprises one or more perfume raw materials selected from the group consisting of 1,1'-oxybis-2-propanol; 1,4-cyclohexanedicarboxylic acid, diethyl ester; (ethoxymethoxy)cyclododecane; 1,3-nonanediol, monoacetate; (3-methylbutoxy)acetic acid, 2-propenyl ester; beta-methyl cyclododecaneethanol; 2-methyl-3-[(1,7,7-trimethylbicyclo[2.2.1]hept-2-yl)oxy]-1-propanol; oxacyclohexadecan-2-one; alpha-methyl-benzenemethanol acetate; trans-3-ethoxy-1,1,5-trimethylcyclohexane; 4-(1,1-dimethylethyl)cyclohexanol acetate; dodecahydro-3a,6,6,9a-tetramethylnaphtho[2,1-b]furan; beta-methyl benzenepropanal; beta-methyl-3-(1-methylethyl) benzenepropanal; 4-phenyl-2-butanone; 2-methylbutanoic acid, ethyl ester; benzaldehyde; 2-methylbutanoic acid, 1-methylethyl ester; dihydro-5-pentyl-2(3H)furanone; (2E)-1-(2,6,6-trimethyl-2-cyclohexen-1-yl)-2-buten-1-one; dodecanal; undecanal; 2-ethyl-alpha, alpha-dimethylbenzenepropanal; decanal; alpha, alpha-dimethylbenzeneethanol acetate; 2-(phenylmethylene)octanal; 2-[[3-[4-(1,1-dimethylethyl)phenyl]-2-methylpropylidene]amino]benzoic acid, methyl ester; 1-(2,6,6-trimethyl-3-cyclohexen-1-yl)-2-buten-1-one; 2-pentylcyclopentanone; 3-oxo-2-pentyl cyclopentaneacetic acid, methyl ester; 4-hydroxy-3-methoxybenzaldehyde; 3-ethoxy-4-hydroxybenzaldehyde; 2-heptylcyclopentanone; 1-(4-methylphenyl)ethanone; (3E)-4-(2,6,6-trimethyl-1-cyclohexen-1-yl)-3-buten-2-one; (3E)-4-(2,6,6-trimethyl-2-cyclohexen-1-yl)-3-buten-2-one; benzeneethanol; 2H-1-benzopyran-2-one; 4-methoxybenzaldehyde; 10-undecenal; propanoic acid, phenylmethyl ester; beta-methylbenzenepentanol; 1,1-diethoxy-3,7-dimethyl-2,6-octadiene; alpha,alpha-dimethylbenzeneethanol; (2E)-1-(2,6,6-trimethyl-1-cyclohexen-1-yl)-2-buten-1-one; acetic acid, phenylmethyl ester; cyclohexanepropanoic acid, 2-propenyl ester; hexanoic acid, 2-propenyl ester; 1,2-dimethoxy-4-(2-propenyl)benzene; 1,5-dimethyl-bicyclo[3.2.1]octan-8-one oxime; 4-(4-hydroxy-4-methylpentyl)-3-cyclohexene-1-carboxaldehyde; 3-buten-2-ol; 2-[[[2,4(or 3,5)-dimethyl-3-cyclohexen-1-yl]methylene]amino]benzoic acid, methyl ester; 8-cyclohexadecen-1-one; methyl ionone; 2,6-dimethyl-7-octen-2-ol; 2-methoxy-4-(2-propenyl)phenol; (2E)-3,7-dimethyl-2,6-Octadien-1-ol; 2-hydroxy-Benzoic acid, (3Z)-3-hexenyl ester; 2-tridecenenitrile; 4-(2,2-dimethyl-6-methylenecyclohexyl)-3-methyl-3-buten-2-one; tetrahydro-4-methyl-2-(2-methyl-1-propenyl)-2H-pyran; Acetic acid, (2-methylbutoxy)-, 2-propenyl ester; Benzoic acid, 2-hydroxy, 3-methylbutyl ester; 2-Buten-1-one, 1-(2,6,6-trimethyl-1-cyclohexen-1-yl)-, (Z)-; Cyclopentanecarboxylic acid, 2-hexyl-3-oxo-, methyl ester; Benzenepropanal, 4-ethyl-alpha,alpha-dimethyl-; 3-Cyclohexene-1-carboxaldehyde, 3-(4-hydroxy-4-methylpentyl)-; Ethanone, 1-(2,3,4,7,8,8a-hexahydro-3,6,8,8-tetramethyl-1H-3a,7-methanoazulen-5-yl)-, [3R-(3.alpha,3a.beta,7.beta,8a.alpha)]-; Undecanal, 2-methyl-2H-Pyran-2-one, 6-butyltetrahydro-; Benzenepropanal, 4-(1,1-dimethylethyl)-.alpha-methyl-; 2(3H)-Furanone, 5-heptyldihydro-; Benzoic acid, 2-[(7-hydroxy-3,7-dimethyloctylidene)amino]-, methyl; Benzoic acid, 2-hydroxy-, phenylmethyl ester; Naphthalene, 2-methoxy-; 2-Cyclopenten-1-one, 2-hexyl-; 2(3H)-Furanone, 5-hexyldihydro-; Oxiranecarboxylic acid, 3-methyl-3-phenyl-, ethyl ester; 2-Oxabicyclo[2.2.2]octane, 1,3,3-trimethyl-; Benzenepentanol, gamma-methyl-; 3-Octanol, 3,7-dimethyl-; 3,7-dimethyl-2,6-octadienenitrile; 3,7-dimethyl-6-octen-1-ol; Terpineol acetate; 2-methyl-6-methylene-7-Octen-2-ol, dihydro derivative; 3a,4,5,6,7,7a-hexahydro-4,7-Methano-1H-inden-6-ol propanoate; 3-methyl-2-buten-1-ol acetate; (Z)-3-Hexen-1-ol acetate; 2-ethyl-4-(2,2,3-trimethyl-3-cyclopenten-1-yl)-2-buten-1-ol; 4-(octahydro-4,7-methano-5H-inden-5-ylidene)-butanal; 3-2,4-dimethyl-cyclohexene-1-carboxaldehyde; 1-(1,2,3,4,5,6,7,8-octahydro-2,3,8,8-tetramethyl-2-naphthalenyl)-ethanone; 2-hydroxy-benzoic acid, methyl ester; 2-hydroxy-benzoic acid, hexyl ester; 2-phenoxy-ethanol; 2-hydroxy-benzoic acid, pentyl ester; 2,3-heptanedione; 2-hexen-1-ol; 6-Octen-2-ol, 2,6-dimethyl-; damascone (alpha, beta, gamma or delta or mixtures thereof), 4,7-Methano-1H-inden-6-ol, 3a,4,5,6,7,7a-hexahydro-, acetate; 9-Undecenal; 8-Undecenal; Isocyclocitral; Ethanone, 1-(1,2,3,5,6,7,8,8a-octahydro-2,3,8,8-tetramethyl-2-naphthalenyl)-; 3-Cyclohexene-1-carboxaldehyde, 3,5-dimethyl-; 3-Cyclohexene-1-carboxaldehyde, 2,4-dimethyl-; 1,6-Octadien-3-ol, 3,7-dimethyl-; 1,6-Octadien-3-ol, 3,7-dimethyl-, acetate; Lilial (p-t-Bucinal), and Cyclopentanone, 2-[2-(4-methyl-3-cyclohexen-1-yl)propyl]- and 1-methyl-4-(1-methylethenyl)cyclohexene and mixtures thereof.

In one aspect, the composition may comprise an encapsulated perfume particle comprising either a water-soluble hydroxylic compound or melamine-formaldehyde or modified polyvinyl alcohol. In one aspect the encapsulate comprises (a) an at least partially water-soluble solid matrix comprising one or more water-soluble hydroxylic compounds, preferably starch; and (b) a perfume oil encapsulated by the solid matrix.

In a further aspect the perfume may be pre-complexed with a polyamine, preferably a polyethylenimine so as to form a Schiff base.

Polymers

A composition of the invention may also comprise one or more polymers. Examples are carboxymethylcellulose, poly(vinyl-pyrrolidone), poly (ethylene glycol), poly(vinyl alcohol), poly(vinylpyridine-N-oxide), poly(vinylimidazole), polycarboxylates such as polyacrylates, maleic/acrylic acid copolymers and lauryl methacrylate/acrylic acid co-polymers.

The composition may comprise one or more amphiphilic cleaning polymers such as the compound having the following general structure: bis($(C_2H_5O)(C_2H_4O)n)(CH_3)$—$N^+$—$C_xH_{2x}$—$N^+$—$(CH_3)$-bis($(C_2H_{50})(C_2H_4O)n)$, wherein n=from 20 to 30, and x=from 3 to 8, or sulphated or sulphonated variants thereof.

The composition may comprise amphiphilic alkoxylated grease cleaning polymers which have balanced hydrophilic and hydrophobic properties such that they remove grease particles from fabrics and surfaces. Specific embodiments of the amphiphilic alkoxylated grease cleaning polymers of the present invention comprise a core structure and a plurality of alkoxylate groups attached to that core structure. These may comprise alkoxylated polyalkylenimines, preferably having an inner polyethylene oxide block and an outer polypropylene oxide block.

Alkoxylated polycarboxylates such as those prepared from polyacrylates are useful herein to provide additional grease removal performance. Such materials are described in WO 91/08281 and PCT/90/01815. Chemically, these materials comprise polyacrylates having one ethoxy side-chain per every 7-8 acrylate units. The side-chains are of the formula $—(CH_2CH_2O)_m(CH_2)_nCH_3$ wherein m is 2-3 and n is 6-12. The side-chains are ester-linked to the polyacrylate "backbone" to provide a "comb" polymer type structure. The molecular weight can vary, but is typically in the range of 2000 to 50,000. Such alkoxylated polycarboxylates can comprise from 0.05 to 10 wt. % of the compositions herein.

The isoprenoid-derived surfactants of the present invention, and their mixtures with other cosurfactants and other adjunct ingredients, are particularly suited to be used with an amphilic graft co-polymer, preferably the amphilic graft co-polymer comprises (i) polyethyelene glycol backbone; and (ii) and at least one pendant moiety selected from polyvinyl acetate, polyvinyl alcohol and mixtures thereof. A preferred amphilic graft co-polymer is Sokalan HP22, supplied from BASF. Suitable polymers include random graft copolymers, preferably a polyvinyl acetate grafted polyethylene oxide copolymer having a polyethylene oxide backbone and multiple polyvinyl acetate side chains. The molecular weight of the polyethylene oxide backbone is preferably 6000 and the weight ratio of the polyethylene oxide to polyvinyl acetate is 40 to 60 and no more than 1 grafting point per 50 ethylene oxide units.

Carboxylate Polymer

The composition of the present invention may include one or more carboxylate polymers such as a maleate/acrylate random copolymer or polyacrylate homopolymer. In one aspect, the carboxylate polymer is a polyacrylate homopolymer having a molecular weight of from 4,000 to 9,000 Da, or from 6,000 to 9,000 Da.

Soil Release Polymer

The composition of the present invention may also include one or more soil release polymers having a structure as defined by one of the following structures (1), (II) or (Ill):

$$—[(OCHR^1—CHR^2)_a—O—OC—Ar—CO-]_d \quad (I)$$

$$—[(OCHR^3—CHR^4)_b—O—OC\text{-}sAr\text{-}CO-]_e \quad (II)$$

$$—[(OCHR^5—CHR^6)_c—OR^7]_f \quad (III)$$

wherein:

a, b and c are from 1 to 200;

d, e and f are from 1 to 50;

Ar is a 1,4-substituted phenylene;

sAr is 1,3-substituted phenylene substituted in position 5 with $SO_3Me$;

Me is Li, K, Mg/2, Ca/2, Al/3, ammonium, mono-, di-, tri-, or tetraalkylammonium, wherein the alkyl groups are $C_1$-$C_{18}$ alkyl or $C_2$-$C_{10}$ hydroxyalkyl, or mixtures thereof;

$R^1$, $R^2$, $R^3$, $R^4$, $R^5$ and $R^6$ are independently selected from H or $C_1$-$C_{18}$ n- or iso-alkyl; and $R^7$ is a linear or branched C1-$C_{18}$ alkyl, or a linear or branched $C_2$-$C_{30}$ alkenyl, or a cycloalkyl group with 5 to 9 carbon atoms, or a $C_8$-C30 aryl group, or a $C_6$-$C_0$ arylalkyl group.

Suitable soil release polymers are polyester soil release polymers such as Repel-o-tex polymers, including Repel-o-tex, SF-2 and SRP6 supplied by Rhodia. Other suitable soil release polymers include Texcare polymers, including Texcare SRA100, SRA300, SRN100, SRN170, SRN240, SRN300 and SRN325 supplied by Clariant. Other suitable soil release polymers are Marloquest polymers, such as Marloquest SL supplied by Sasol.

Cellulosic Polymer

The composition of the present invention may also include one or more cellulosic polymers including those selected from alkyl cellulose, alkyl alkoxyalkyl cellulose, carboxyalkyl cellulose, alkyl carboxyalkyl cellulose. In one aspect, the cellulosic polymers are selected from the group comprising carboxymethyl cellulose, methyl cellulose, methyl hydroxyethyl cellulose, methyl carboxymethyl cellulose, and mixures thereof. In one aspect, the carboxymethyl cellulose has a degree of carboxymethyl substitution from 0.5 to 0.9 and a molecular weight from 100,000 to 300,000 Da.

Lipases

A composition of the invention comprises, besides a surfactant or a surfactant system and ricinoleic acid, a ricinoleic salt, or a ricinoleic ester, also a lipase. The lipase may be any lipase. In an embodiment the lipase is of microbial origin. In an embodiment the lipase is of bacterial origin. In a preferred embodiment, the lipase is of fungal origin, such as from a filamentous fungus or a yeast.

The lipase may be chemically modified or may be a protein engineered mutant. Examples include lipase from *Thermomyces*, e.g., from *T. lanuginosus* (previously named *Humicola lanuginosa*) as described in EP 258068 and EP 305216, cutinase from *Humicola*, e.g., *H. insolens* (WO 96/13580), lipase from strains of *Pseudomonas* (some of these now renamed to *Burkholderia*), e.g., *P. alcaligenes* or *P. pseudoalcaligenes* (EP 218272), *P. cepacia* (EP 331376), P. sp. strain SD705 (WO 95/06720 & WO 96/27002), *P. wisconsinensis* (WO 96/12012), GDSL-type *Streptomyces* lipases (WO 2010/065455), cutinase from *Magnaporthe grisea* (WO 2010/107560), cutinase from *Pseudomonas mendocina* (U.S. Pat. No. 5,389,536), lipase from *Thermobifida fusca* (WO 2011/084412, WO 2013/033318), *Geobacillus stearothermophilus* lipase (WO 2011/084417), lipase from *Bacillus subtilis* (WO 2011/084599), and lipase from *Streptomyces griseus* (WO 2011/150157) and *S. pristinaespiralis* (WO 2012/137147).

Other examples are lipase variants such as those described in EP 407225, WO 92/05249, WO 94/01541, WO 94/25578, WO 95/14783, WO 95/30744, WO 95/35381, WO 95/22615, WO 96/00292, WO 97/04079, WO 97/07202, WO 00/34450, WO 00/60063, WO 01/92502, WO 2007/087508 and WO 2009/109500.

Still other examples are lipases sometimes referred to as acyltransferases or perhydrolases, e.g., acyltransferases with homology to *Candida antarctica* lipase A (WO 2010/111143), acyltransferase from *Mycobacterium smegmatis* (WO 2005/056782), perhydrolases from the CE 7 family (WO 2009/067279), and variants of the *M. smegmatis* perhydrolase in particular the S54V variant used in the commercial product Gentle Power Bleach from Huntsman Textile Effects Pte Ltd (WO 2010/100028).

Preferred commercial lipase products include Lipolase™, Lipex™; Lipolex™, Lipoclean™ Lipex Evity 100L, Lipex Evity 105T, Lipex Evity 200L (Novozymes A/S), Lumafast (originally from Genencor), Preferenz L100 (Danisco US Inc.), and Lipomax (originally from Gist-Brocades).

In a preferred embodiment, the composition of the invention comprises a fungal lipase derived from a strain of *Thermomyces lanuginosus* (synonym *Humicola lanuginosa*). In a specific embodiment, the lipase is the one shown in SEQ ID NO: 1 or preferably a variant thereof.

In an embodiment, the lipase is a variant of a parent lipase, wherein the parent lipase is selected from the group consisting of:

a) a polypeptide having at least 60%, at least 65%, at least 70%, at least 75%, at least 80%, at least 85%, at least 90%, at least 95% identity, at least 96%, at least 97%, at least 98%, or at least 99%, or 100% sequence identity to SEQ ID NO: 1;

b) a fragment of the polypeptide of SEQ ID NO: 1.

In an embodiment, the lipase is a variant having lipase activity and having at least 60%, at least 65%, at least 70%, at least 75%, at least 80%, at least 85%, at least 90%, at least 95% identity, at least 96%, at least 97%, at least 98%, or at least 99%, but less than 100% sequence identity to SEQ ID NO: 1.

In a preferred embodiment, the lipase is a variant having lipase activity and has at least 60% but less than 100% sequence identity with SEQ ID NO: 1, and comprises substitutions at positions corresponding to T231R+N233R and at least one or more (e.g., several) of D96E, D111A, D254S, G163K, P256T, G91T and G38A of SEQ ID NO: 1.

In a specific embodiment, the lipase is a variant of a parent lipase, wherein the variant has lipase activity, has at least 60%, in particular at least 65%, at least 70%, at least 75% at least 80%, at least 85%, at least 90%, at least 95%, at least 96%, at least 97%, at least 98%, at least 99% but less than 100% sequence identity with SEQ ID NO: 1, and comprises substitutions at positions corresponding to T231R+N233R and at least one or more (e.g., several) of D96E, D111A, D254S, G163K, P256T, G91T and G38A of SEQ ID NO: 1 selected from the group of:

a) D27R+N33Q+G38A+G91T+D96E+D111A+G163K+T231R+N233R+D254S;

b) D27R+N33Q+G38A+G91T+D96E+D111A+G163K+T231R+N233R+P256T;

c) D27R+N33Q+G38A+G91T+D96E+G163K+T231R+N233R+D254S+P256T;

d) D27R+N33Q+G38A+D96E+D111A+G163K+T231R+N233R+D254S+P256T;

e) D27R+N33Q+G38A+D96E+D111A+T231R+N233R+D254S+P256T;

f D27R+G38A+G91T+D96E+D111A+G163K+T231R+N233R+D254S;

g) D27R+G38A+G91T+D96E+D111A+G163K+T231R+N233R+D254S+P256T;

h) D27R+G38A+G91T+D96E+G163K+T231R+N233R+D254S+P256T;

i) D27R+G38A+D96E+D111A+G163K+E210Q+T231R+N233R+D254S+P256T;

j) D27R+G38A+D96E+D111A+G163K+T231R+N233R+D254S+P256T;

k) D27R+G38A+D96E+G163K+T231R+N233R+D254S+P256T

I) D27R+G91T+D96E+D111A+G163K+T231R+N233R+D254S+P256T;

m) D27R+D96E+D111A+G163K+T231R+N233R;

n) D27R+D96E+D111A+G163K+T231R+N233R+D254S+P256T;

o) D27R+D96E+D111A+T231R+N233R;

p) D27R+D96E+G163K+T231R+N233R+D254S;

q) D27R+G163K+T231R+N233R+D254S;

r) D27R+T231R+N233R+D254S+P256T;

s) N33Q+G38A+G91T+D96E+D111A+G163K+T231R+N233R+D254S+P256T;

t) N33Q+G38A+G91T+G163K+T231R+N233R+D254S;

u) N33Q+D96E+D111A+G163K+T231R+N233R+D254S+P256T;

v) N33Q+D96E+T231R+N233R;

w) N33Q+D111A+T231R+N233R;

x) N33Q+T231R+N233R+P256T;

y) G38A+D96E+D111A+T231R+N233R;

z) G91T+D96E+D111A+G163K+T231R+N233R+D254S+P256T;

aa) G91T+D96E+D111A+T231R+N233R;

bb) G91T+D96E+T231R+N233R;

cc) G91T+T231R+N233R+D254S+P256T;

dd) D96E+D111A+G163K+T231R+N233R;

ee) D96E+D111A+G163K+T231R+N233R+D254S+P256T;

ff) D96E+D111A+G163K+T231R+N233R+P256T;

gg) D96E+D111A+T231R+N233R;

hh) D96E+D111A+T231R+N233R+D254S;

ii) D96E+D111A+T231R+N233R+D254S+P256T jj) D96E+D111A+T231R+N233R+P256T;

kk) D96E+G163K+T231R+N233R+D254S;

ll) D96E+G163K+T231R+N233R+D254S+P256T;

mm) D96E+T231R+N233R;

nn) D96E+T231R+N233R+D254S;

oo) D96E+T231R+N233R+D254S+P256T;

pp) D96E+T231R+N233R+P256T;

qq) D111A+G163K+T231R+N233R+D254S+P256T;

rr) D111A+T231R+N233R;

ss) D111A+T231R+N233R+D254S+P256T;

tt) G163K+T231R+N233R+D254S;

uu) T231R+N233R+D254S+P256T;

vv) T231R+N233R+P256T.

In another embodiment, the lipase is a variant of a parent lipase, wherein said variant (a) comprises a modification in at least one position corresponding to positions E1, V2, N33, F51, E56, L69, K98, V176, H198, E210, Y220, L227, and K237 of SEQ ID NO: 1; and optionally further comprises a modification in at least one position corresponding to positions D27, G38, D96, D111, G163, T231, N233, D254, and P256 of SEQ ID NO: 1;

(b) has a sequence identity of at least 60%, at least 65%, at least 70%, at least 75% at least 80%, at least 85%, at least 90%, at least 95%, at least 96%, at least 97%, at least 98%, at least 99% but less than 100% to SEQ ID NO: 1;

(c) has lipase activity.

In an embodiment, the lipase is a variant of a parent lipase, wherein the parent lipase is selected from the group consisting of:

a) a polypeptide having at least 60%, at least 65%, at least 70%, at least 75%, at least 80%, at least 85%, at least 90%, at least 95% identity, at least 96%, at least 97%, at least 98%, or at least 99%, or 100% sequence identity to SEQ ID NO: 1;

b) a fragment of the polypeptide of SEQ ID NO: 1.

In an embodiment, the lipase is a variant having lipase activity and having at least 60%, at least 65%, at least 70%, at least 75%, at least 80%, at least 85%, at least 90%, at least 95% identity, at least 96%, at least 97%, at least 98%, or at least 99%, but less than 100% sequence identity to SEQ ID NO: 1.

In an embodiment, the lipase variant comprises a modification in at least one of the following positions corresponding to: E1, V2, D27, N33, G38, F51, E56, L69, D96, K98, D111, G163, V176, $H_{198}$, E210, Y220, L227, T231, N233, K237, D254, and P256, wherein numbering is according to SEQ ID NO: 1. More preferably, the lipase variant comprises at least one of the following modifications corresponding to: E1C, V2Y, D27R, N33K, N33Q, G38A, F51V, E56K, L69R, D96E, D96L, K981, K98Q, D111A, G163K, V176L, $H_{198}$S, E210K, Y220F, L227G, T231R, N233R, N233C, K237C, D254S, and P256T, wherein numbering is according to SEQ ID NO: 1.

In an embodiment, the said lipase variant further comprises one of the substitutions selected from the group of: S54T, S83T, G91A, A150G, 1255A, and E239C.

In a preferred embodiment, the lipase variant comprises substitutions corresponding to E1C+N233C in SEQ ID NO: 1 and optionally one or more additional substitutions.

In a specific embodiment, the variant has lipase activity, has at least 60%, at least 65%, at least 70%, at least 75% at least 80%, at least 85%, at least 90%, at least 95%, at least 96%, at least 97%, at least 98%, at least 99% but less than 100% sequence identity with SEQ ID NO: 1 and comprises or consists of substitutions corresponding to one of the following set of substitutions using SEQ ID NO: 1 for numbering:

| |
|---|
| E1C + V2A + N233C |
| E1C + V2I + N233C |
| E1C + V2K + N233C |
| E1C + V2N + N233C |
| E1C + V2Y + N233C |
| E1C + D27R + N33K + G38A + F51V + D96E + K98I + D111A + G163K + H198S + Y220F + T231R + N233C |
| E1C + D27R + G38A + F51I + D96E + K98I + D111A + G163K + H198S + Y220F + T231R + N233C + D254S + P256T |
| E1C + D27R + G38A + F51L + D96E + K98I + D111A + G163K + H198S + Y220F + T231R + N233C + D254S + P256T |
| E1C + D27R + G38A + F51L + K98I + D111A + G163S + H198S + Y220F + T231R + N233C + P256T |
| E1C + D27R + G38A + F51V + D96E + K98I + D111A + G163K + H198S + Y220F + T231R + N233C + D254S + P256T |
| E1C + D27R + G38A + F51V + D96E + K98I + D111A + G163K + H198S + Y220F + T231R + N233C + P256T |
| E1C + D27R + G38R + F51L + D96E + K98I + D111A + G163K + H198S + Y220F + T231R + N233C + D254S + P256T |
| E1C + D27R + G38R + F51V + D96E + K98I + D111A + G163K + H198S + Y220F + T231R + N233C + D254S + P256T |
| E1C + D27R + F51I + E56R + K98E + T231R + N233C |
| E1C + D27R + F51I + E56R + K98E + T231R + N233C + D254S |
| E1C + D27R + F51L + D96E + K98I + D111A + G163K + H198S + Y220F + T231R + N233C + D254S + P256T |
| E1C + D27R + F51L + D96E + K98I + D111A + G163K + H198S + Y220F + T231R + N233C + P256T |
| E1C + D27R + F51L + D96E + K98I + D111A + G163S + H198S + Y220F + T231R + N233C + P256T |
| E1C + D27R + F51L + D96I + K98I + D111A + G163K + H198S + Y220F + T231R + N233C + P256T |
| E1C + D27R + F51V + D96E + K98I + D111A + G163K + H198S + Y220F + T231R + N233C + D254S + P256T |
| E1C + D27R + F51V + D96E + K98I + D111A + G163K + H198S + Y220F + T231R + N233C + P256T |
| E1C + D27R + F51V + D96E + K98I + D111A + G163S + H198S + Y220F + T231R + N233C + D254S + P256T |
| E1C + D27R + F51V + D96I + K98I + D111A + G163K + H198S + Y220F + T231R + N233C + D254S + P256T |
| E1C + D27R + F51V + K98I + D111A + G163K + H198S + Y220F + T231R + N233C + D254S + P256T |
| E1C + D27R + F51Y + N233C |
| E1C + N33K + N233C |
| E1C + N33Q + N233C |
| E1C + G38A + F51V + D96E + K98I + D111A + G163K + H198S + Y220F + T231R + N233C + D254S + P256T |
| E1C + G38A + F51V + D96E + K98I + D111A + G163K + H198S + Y220F + T231R + N233C + P256T |
| E1C + G38A + N233C |
| E1C + G38R + F51V + D96E + K98I + D111A + G163K + H198S + Y220F + T231R + N233C + D254S + P256T |
| E1C + F51I + D96E + K98I + D111A + G163K + H198S + Y220F + T231R + N233C + D254S + P256T |
| E1C + F51I + N233C |
| E1C + F51L + D96E + K98I + D111A + G163K + H198S + Y220F + T231R + N233C + D254S + P256T |
| E1C + F51L + N233C |
| E1C + F51M + N233C |
| E1C + F51V + D96E + K98I + D111A + G163K + H198S + Y220F + T231R + N233C + D254S + P256T |
| E1C + F51V + D96E + K98I + D111A + G163K + H198S + Y220F + T231R + N233C + P256T |
| E1C + F51V + D96E + K98I + D111A + G163S + H198S + Y220F + T231R + N233C + P256T |
| E1C + F51V + D96I + K98I + D111A + G163K + H198S + Y220F + T231R + N233C + D254S + P256T |
| E1C + F51V + K98I + D111A + G163K + H19S + Y220F + T231R + N233C + D254S + P256T |
| E1C + E56K + N233C |
| E1C + E56Q + N233C |
| E1C + E56R + N233C |
| E1C + E56S + N233C |
| E1C + L69C + N233C |
| E1C + L69F + N233C |
| E1C + L69H + N233C |
| E1C + L69R + N233C |

-continued

| |
|---|
| E1C + L69S + N233C |
| E1C + L69T + N233C |
| E1C + L69V + N233C |
| E1C + D96E + N233C |
| E1C + D96L + N233C |
| E1C + K98E + N233C |
| E1C + K98I + N233C |
| E1C + K98Q + N233C |
| E1C + K98R + N233C |
| E1C + K98T + N233C |
| E1C + K98V + N233C |
| E1C + D111A + N233C |
| E1C + L147S + N233C + D254S |
| E1C + V176L + N233C |
| E1C + V176M + N233C |
| E1C + H198D + N233C |
| E1C + H198G + N233C |
| E1C + H198L + N233C |
| E1C + H198S + N233C |
| E1C + H198T + N233C |
| E1C + H198Y + N233C |
| E1C + E210A + N233C |
| E1C + E210K + N233C |
| E1C + E210N + N233C |
| E1C + E210Q + N233C |
| E1C + E210R + N233C |
| E1C + E210T + N233C |
| E1C + Y220F + N233C |
| E1C + L227F + N233C |
| E1C + L227G + N233C |
| E1C + L227R + N233C |
| E1C + T231R + N233C |
| E1C + N233C |
| E1C + N233C + D254S |
| E1C + N233C + P256T |
| E1C + K237C |

Additional Enzymes

Besides a lipase enzyme, a composition of the invention may comprise one or more additional enzymes which provide cleaning performance and/or fabric care benefits. Examples of suitable enzymes include, but are not limited to, proteases, alpha-amylases, cellulases, phospholipases, cutinases, pectinases, mannanases, pectate lyases, phosphodiesterases (PDEs), deoxyribonucleases (DNases), or mixtures thereof. A typical combination is an enzyme cocktail that may comprise, e.g., a protease and lipase in conjunction with an alpha-amylase, phospholipases, cutinases, pectinases, mannanases, pectate lyases, phosphodiesterases (PDEs), deoxyribonucleases (DNases), or mixtures thereof.

When present in a composition, the aforementioned additional enzymes may be present at levels from 0.00001 to 2 wt. %, from 0.0001 to 1 wt. % or from 0.001 to 0.5 wt. % enzyme protein by weight of the composition.

In general, the properties of the selected enzyme(s) should be compatible with the selected detergent, (i.e., pH-optimum, compatibility with other enzymatic and non-enzymatic ingredients, etc.), and the enzyme(s) should be present in effective amounts.

Proteases: In one aspect, a preferred additional enzyme is a protease. Suitable proteases include those of bacterial, fungal, plant, viral or animal origin, e.g., vegetable or microbial origin. Proteases of microbial origin are preferred. Chemically modified or protein engineered mutants are included. It may be an alkaline protease, such as a serine protease or a metalloprotease. A serine protease may for example be of the S1 family, such as trypsin, or the S8 family such as subtilisin. A metalloproteases protease may for example be a thermolysin from, e.g., family M4 or other metalloprotease such as those from M5, M7 or M8 families.

The term “subtilases” refers to a sub-group of serine protease according to Siezen et al., 1991, *Protein Engng.* 4: 719-737 and Siezen et al., 1997, *Protein Science* 6: 501-523. Serine proteases are a subgroup of proteases characterized by having a serine in the active site, which forms a covalent adduct with the substrate. The subtilases may be divided into 6 sub-divisions, i.e., the Subtilisin family, the Thermitase family, the Proteinase K family, the Lantibiotic peptidase family, the Kexin family and the Pyrolysin family.

Examples of subtilases are those derived from *Bacillus* such as *Bacillus lentus, B. alkalophilus, B. subtilis, B. amyloliquefaciens, Bacillus pumilus* and *Bacillus gibsonii* described in; U.S. Pat. No. 7,262,042 and WO 2009/021867, and subtilisin *lentus*, subtilisin *Novo*, subtilisin Carlsberg, *Bacillus licheniformis*, subtilisin BPN', subtilisin 309, subtilisin 147 and subtilisin 168 described in WO 89/06279 and protease PD138 described in (WO 93/18140). Other useful proteases may be those described in WO 92/175177, WO 01/16285, WO 02/026024 and WO 02/016547. Examples of trypsin-like proteases are trypsin (e.g., of porcine or bovine origin) and the *Fusarium* protease described in WO 89/06270, WO 94/25583 and WO 2005/040372, and the chymotrypsin proteases derived from Cellumonas described in WO 2005/052161 and WO 2005/052146.

A further preferred protease is the alkaline protease from *Bacillus lentus* DSM 5483, as described for example in WO 95/23221, and variants thereof which are described in WO 92/21760, WO 95/23221, EP1921147 and EP 1921148.

Examples of metalloproteases are the neutral metalloprotease as described in WO 2007/044993 (Genencor Int.) such as those derived from *Bacillus amyloliquefaciens*.

Examples of useful proteases are the variants described in: WO 92/19729, WO 96/034946, WO 98/20115, WO 98/20116, WO 99/11768, WO 01/44452, WO 03/006602, WO 2004/03186, WO 2004/041979, WO 2007/006305, WO 2011/036263, WO 2011/036264, especially the variants with substitutions in one or more of the following positions: 3, 4, 9, 15, 27, 36, 57, 68, 76, 87, 95, 96, 97, 98, 99, 100, 101, 102, 103, 104, 106, 118, 120, 123, 128, 129, 130, 160, 167, 170, 194, 195, 199, 205, 206, 217, 218, 222, 224, 232, 235, 236, 245, 248, 252 and 274 using the BPN' numbering. More preferred the subtilase variants may comprise the mutations: S3T, V41, S9R, A15T, K27R, *36D, V68A, N76D, N87S,R, *97E, A98S, S99G,D,A, S99AD, S101G,M,R S103A, V1041,Y,N, S106A, G118V,R, H120D,N, N123S, S128L, P129Q, S130A, G160D, Y167A, R170S, A194P, G195E, V199M, V2051, L217D, N218D, M222S, A232V, K235L, Q236H, Q245R, N252K, T274A (using BPN' numbering).

Suitable commercially available protease enzymes include those sold under the trade names Alcalase®, Blaze®; Duralase™, Durazym™, Relase®, Relase® Ultra, Savinase®, Savinase® Ultra, Primase®, Polarzyme®, Kannase®, Liquanase®, Liquanase® Ultra, Ovozyme®, Coronase®, Coronase® Ultra, Neutrase®, Everlase® and Esperase® all could be sold as Ultra® or Evity® (Novozymes A/S), those sold under the tradename Maxatase®, Maxacal®, Maxapem®, Purafect®, Purafect Prime®, Preferenz™, Purafect MA®, Purafect Ox®, Purafect OxP®, Puramax®, Properase®, Effectenz™, FN2®, FN3®, FN4®, Excellase®, Opticlean® and Optimase® (Danisco/DuPont), Axapem™ (Gist-Brocases N.V.), BLAP (sequence shown in FIG. 29 of U.S. Pat. No. 5,352,604) and variants hereof (Henkel AG) and KAP (*Bacillus alkalophilus* subtilisin) from Kao.

Amylases: In one aspect, the preferred additional enzyme is an amylase. Suitable amylases may be an alpha-amylase or a glucoamylase and may be of bacterial or fungal origin. Chemically modified or protein engineered mutants are included. Amylases include, for example, alpha-amylases obtained from *Bacillus*, e.g., a special strain of *Bacillus licheniformis*, described in more detail in GB 1296839.

Suitable amylases include amylases having SEQ ID NO: 3 in WO 95/10603 or variants having 90% sequence identity to SEQ ID NO: 3 thereof. Preferred variants are described in WO 94/02597, WO 94/18314, WO 97/43424 and SEQ ID NO: 4 of WO 99/19467, such as variants with substitutions in one or more of the following positions: 15, 23, 105, 106, 124, 128, 133, 154, 156, 178, 179, 181, 188, 190, 197, 201, 202, 207, 208, 209, 211, 243, 264, 304, 305, 391, 408, and 444.

Different suitable amylases include amylases having SEQ ID NO: 6 in WO 02/010355 or variants thereof having 90% sequence identity to SEQ ID NO: 6. Preferred variants of SEQ ID NO: 6 are those having a deletion in positions 181 and 182 and a substitution in position 193.

Other amylases which are suitable are hybrid alpha-amylase comprising residues 1-33 of the alpha-amylase derived from *B. amyloliquefaciens* shown in SEQ ID NO: 6 of WO 2006/066594 and residues 36-483 of the *B. licheniformis* alpha-amylase shown in SEQ ID NO: 4 of WO 2006/066594 or variants having 90% sequence identity thereof. Preferred variants of this hybrid alpha-amylase are those having a substitution, a deletion or an insertion in one of more of the following positions: G48, T49, G107, H156, A181, N190, M197, 1201, A209 and Q264. Most preferred variants of the hybrid alpha-amylase comprising residues 1-33 of the alpha-amylase derived from *B. amyloliquefaciens* shown in SEQ ID NO: 6 of WO 2006/066594 and residues 36-483 of SEQ ID NO: 4 are those having the substitutions:

G48A+T491+G107A+H156Y+A181T+N190F+1201F+A209V+Q264S;

H156Y+A181T+N190F+A209V+Q264S; or

M197T.

Further amylases which are suitable are amylases having SEQ ID NO: 6 in WO 99/19467 or variants thereof having 90% sequence identity to SEQ ID NO: 6. Preferred variants of SEQ ID NO: 6 are those having a substitution, a deletion or an insertion in one or more of the following positions: R181, G182, H183, G184, N195, 1206, E212, E216 and K269. Particularly preferred amylases are those having deletion in positions R181 and G182, or positions $H_{183}$ and G184.

Additional amylases which can be used are those having SEQ ID NO: 1, SEQ ID NO: 3, SEQ ID NO: 2 or SEQ ID NO: 7 of WO 96/23873 or variants thereof having 90% sequence identity to SEQ ID NO: 1, SEQ ID NO: 2, SEQ ID NO: 3 or SEQ ID NO: 7. Preferred variants of SEQ ID NO: 1, SEQ ID NO: 2, SEQ ID NO: 3 or SEQ ID NO: 7 are those having a substitution, a deletion or an insertion in one or more of the following positions: 140, 181, 182, 183, 184, 195, 206, 212, 243, 260, 269, 304 and 476. More preferred variants are those having a deletion in positions 181 and 182 or positions 183 and 184. Most preferred amylase variants of SEQ ID NO: 1, SEQ ID NO: 2 or SEQ ID NO: 7 are those having a deletion in positions 183 and 184 and a substitution in one or more of positions 140, 195, 206, 243, 260, 304 and 476.

Other amylases which can be used are amylases having SEQ ID NO: 2 of WO 2008/153815, SEQ ID NO: 10 in WO 01/66712 or variants thereof having 90% sequence identity to SEQ ID NO: 2 of WO 2008/153815 or 90% sequence identity to SEQ ID NO: 10 in WO 01/66712. Preferred variants of SEQ ID NO: 10 in WO 01/66712 are those having a substitution, a deletion or an insertion in one of more of the following positions: 176, 177, 178, 179, 190, 201, 207, 211 and 264.

Further suitable amylases are amylases having SEQ ID NO: 2 of WO 2009/061380 or variants having 90% sequence identity to SEQ ID NO: 2 thereof. Preferred variants of SEQ ID NO: 2 are those having a truncation of the C-terminus and/or a substitution, a deletion or an insertion in one of more of the following positions: Q87, Q98, S125, N128, T131, T165, K178, R180, S181, T182, G183, M201, F202, N225, S243, N272, N282, Y305, R309, D319, Q320, Q359, K444 and G475. More preferred variants of SEQ ID NO: 2 are those having the substitution in one of more of the following positions: Q87E,R, Q98R, S125A, N128C, T1311, T1651, K178L, T182G, M201L, F202Y, N225E,R, N272E,R, S243Q,A,E,D, Y305R, R309A, Q320R, Q359E, K444E and G475K and/or deletion in position R180 and/or S181 or of T182 and/or G183. Most preferred amylase variants of SEQ ID NO: 2 are those having the substitutions:

N128C+K178L+T182G+Y305R+G475K;

N128C+K178L+T182G+F202Y+Y305R+D319T+G475K;

S125A+N128C+K178L+T182G+Y305R+G475K; or

S125A+N128C+T1311+T165I+K178L+T182G+Y305R+G475K wherein the variants are C-terminally truncated and optionally further comprises a substitution at position 243 and/or a deletion at position 180 and/or position 181.

Other suitable amylases are the alpha-amylase having SEQ ID NO: 12 in WO 01/66712 or a variant having at least 90% sequence identity to SEQ ID NO: 12. Preferred amylase variants are those having a substitution, a deletion or an insertion in one of more of the following positions of SEQ ID NO: 12 in WO 01/66712: R28, R118, N174; R181, G182, D183, G184, G186, W189, N195, M202, Y298, N299, K302, S303, N306, R310, N314; R320, H324, E345, Y396, R400, W439, R444, N445, K446, Q449, R458, N471, N484. Particular preferred amylases include variants having a deletion of D183 and G184 and having the substitutions R118K, N195F, R320K and R458K, and a variant additionally having substitutions in one or more position selected from the group: M9, G149, G182, G186, M202, T257, Y295, N299, M323, E345 and A339, most preferred a variant that additionally has substitutions in all these positions.

Other examples are amylase variants such as those described in WO 2011/098531, WO 2013/001078 and WO 2013/001087.

Commercially available amylases are Duramyl™, Termamyl™, Termamyl Ultra™, Fungamyl™, BAN™, Stainzyme™, Stainzyme Plus™, Amplify®, Amplify® Prime, Achieve® Choice, Achieve® Advance, Supramyl™, Natalase™, Liquozyme X and BAN™ (from Novozymes A/S), KEMZYM® AT 9000 Biozym Biotech Trading GmbH Wehlistrasse 27b A-1200 Wien Austria, and Rapidase™, Purastar™/Effectenz™, Powerase, Preferenz S100, Preferenx S110, Preferenz S210, ENZYSIZE®, OPTISIZE HT PLUS®, and PURASTAR OXAM® (Danisco/DuPont) and KAM® (Kao).

Cellulases: In one aspect, preferred enzymes include cellulases. Suitable cellulases include those of bacterial or fungal origin. Chemically modified or protein engineered mutants are included. Suitable cellulases include cellulases from the genera *Bacillus, Pseudomonas, Humicola, Fusarium, Thielavia, Acremonium*, e.g., the fungal cellulases produced from *Humicola insolens, Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having colour care benefits. Examples of such cellulases are cellulases described in EP 0495257, EP 0531372, WO 96/11262, WO 96/29397, WO 98/08940. Other examples are cellulase variants such as those described in WO 94/07998, EP 0531315, U.S. Pat. Nos. 5,457,046, 5,686,593, 5,763,254, WO 95/24471, WO 98/12307 and PCT/DK98/00299.

Commercially available cellulases include Celluzyme™, and Carezyme™ (Novozymes A/S), Clazinase™, and Puradax HA™ (Genencor International Inc.), and KAC-500 (B)™ (Kao Corporation).

In one aspect, other preferred enzymes include microbial-derived endoglucanases exhibiting endo-beta-1,4-glucanase activity (EC3.2.1.4), including a bacterial polypeptide endogenous to a member of the genus *Bacillus* which has a sequence of at least 90%, 94%, 97% or 99% identity to the amino acid sequence SEQ ID NO:2 in U.S. Pat. No. 7,141,403 and mixtures thereof. Suitable endoglucanases are sold under the tradenames Celluclean® and Whitezyme® (Novozymes).

Pectate lyases, mannanases, DNases and/or PDEs: Other preferred enzymes that additionally may be comprised in the composition of the invention include pectate lyases, e.g., one sold under the tradenames Pectawash®, Pectaway®, or Xpect®; and mannanase, e.g., the one sold under the tradenames Mannaway® (Novozymes), and Purabrite® (Danisco/DuPont). Finally, the composition may also comprise a deoxyribonuclease (DNase) and/or a phosphodiesterase (PDE).

The detergent enzyme(s) may be included in a detergent composition by adding separate additives containing one or more enzymes, or by adding a combined additive comprising all of these enzymes. A detergent additive of the invention, i.e., a separate additive or a combined additive, can be formulated, for example, as granulate, liquid, slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238216.

Dye Transfer Inhibiting Agents—The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in a composition, the dye transfer inhibiting agents may be present at levels from 0.0001 to 10 wt. %, from 0.01 to 5 wt. % or from 0.1 to 3 wt. %.

Brighteners—The compositions of the present invention can also contain additional components that may tint articles being cleaned, such as fluorescent brighteners.

The composition may comprise C.I. fluorescent brightener 260 in alpha-crystalline form having the following structure:

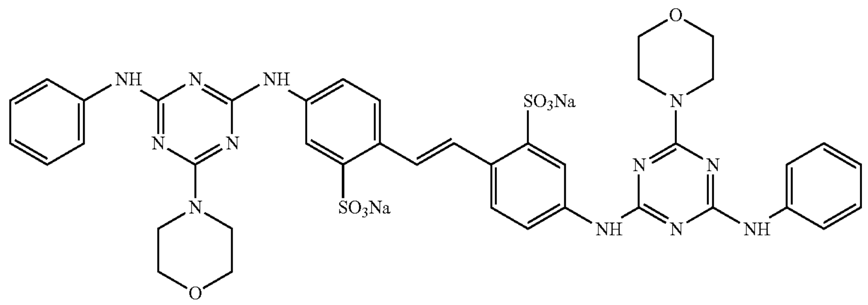

In one aspect, the brightener is a cold water soluble brightener, such as the C.I. fluorescent brightener 260 in alpha-crystalline form. In one aspect the brightener is predominantly in alpha-crystalline form, which means that typically at least 50 wt. %, at least 75 wt. %, at least 90 wt. %, at least 99 wt. %, or even substantially all, of the C.I. fluorescent brightener 260 is in alpha-crystalline form.

The brightener is typically in micronized particulate form, having a weight average primary particle size of from 3 to 30 micrometers, from 3 micrometers to 20 micrometers, or from 3 to 10 micrometers.

The composition may comprise C.I. fluorescent brightener 260 in beta-crystalline form, and the weight ratio of: (i) C.I. fluorescent brightener 260 in alpha-crystalline form, to (ii) C.I. fluorescent brightener 260 in beta-crystalline form may be at least 0.1, or at least 0.6. BE680847 relates to a process for making C.I fluorescent brightener 260 in alpha-crystalline form.

Commercial optical brighteners which may be useful in the present invention can be classified into subgroups, which include, but are not necessarily limited to, derivatives of stilbene, pyrazoline, coumarin, carboxylic acid, methinecyanines, dibenzothiophene-5,5-dioxide, azoles, 5- and 6-membered-ring heterocycles, and other miscellaneous agents. Examples of such brighteners are disclosed in "The Production and Application of Fluorescent Brightening Agents", M. Zahradnik, Published by John Wiley & Sons, New York (1982). Specific nonlimiting examples of optical brighteners which are useful in the present compositions are those identified in U.S. Pat. Nos. 4,790,856 and 3,646,015.

A further suitable brightener has the structure below:

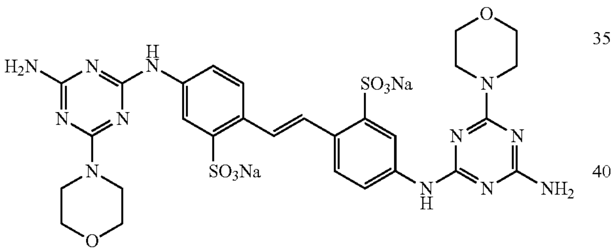

Suitable fluorescent brightener levels include lower levels of from 0.01 wt. %, from 0.05 wt. %, from 0.1 wt. % or from 0.2 wt. % to upper levels of 0.5 wt. % or 0.75 wt. %.

In one aspect the brightener may be loaded onto a clay to form a particle. Silicate salts—The compositions of the present invention can also contain silicate salts, such as sodium or potassium silicate. The composition may comprise of from 0 wt. % to less than 10 wt. % silicate salt, to 9 wt. %, or to 8 wt. %, or to 7 wt. %, or to 6 wt. %, or to 5 wt. %, or to 4 wt. %, or to 3 wt. %, or even to 2 wt. %, and from above 0 wt. %, or from 0.5 wt. %, or from 1 wt. % silicate salt. A suitable silicate salt is sodium silicate.

Dispersants—The compositions of the present invention can also contain dispersants. Suitable water-soluble organic materials include the homo- or co-polymeric acids or their salts, in which the polycarboxylic acid comprises at least two carboxyl radicals separated from each other by not more than two carbon atoms.

Enzyme Stabilizers—Enzymes for use in compositions can be stabilized by various techniques. The enzymes employed herein can be stabilized by the presence of water-soluble sources of calcium and/or magnesium ions. Examples of conventional stabilizing agents are, e.g., a polyol such as propylene glycol or glycerol, a sugar or sugar alcohol, a peptide aldehyde, lactic acid, boric acid, or a boric acid derivative, e.g., an aromatic borate ester, or a phenyl boronic acid derivative such as 4-formylphenyl boronic acid, and the composition may be formulated as described in, for example, WO 92/19709 and WO 92/19708 In case of aqueous compositions comprising protease, a reversible protease inhibitor, such as a boron compound including borate, 4-formyl phenylboronic acid, phenylboronic acid and derivatives thereof, or compounds such as calcium formate, sodium formate and 1,2-propane diol can be added to further improve stability. The peptide aldehyde may be of the formula $B_2$—$B_1$—$B_0$—R wherein: R is hydrogen, $CH_3$, $CX_3$, $CHX_2$, or $CH_2X$, wherein X is a halogen atom; $B_0$ is a phenylalanine residue with an OH substituent at the p-position and/or at the m-position; $B_1$ is a single amino acid residue; and $B_2$ consists of one or more amino acid residues, optionally comprising an N-terminal protection group. Preferred peptide aldehydes include but are not limited to: Z-RAY-H, Ac-GAY-H, Z-GAY-H, Z-GAL-H, Z-GAF-H, Z-GAV-H, Z-RVY-H, Z-LVY-H, Ac-LGAY-H, Ac-FGAY-H, Ac-YGAY-H, Ac-FGVY-H or Ac-WLVY-H, where Z is benzyloxycarbonyl and Ac is acetyl.

Solvents—Suitable solvents include water and other solvents such as lipophilic fluids. Examples of suitable lipophilic fluids include siloxanes, other silicones, hydrocarbons, glycol ethers, glycerine derivatives such as glycerine ethers, perfluorinated amines, perfluorinated and hydrofluoroether solvents, low-volatility nonfluorinated organic solvents, diol solvents, other environmentally-friendly solvents and mixtures thereof.

Structurant/Thickeners—Structured liquids can either be internally structured, whereby the structure is formed by primary ingredients (e.g., surfactant material) and/or externally structured by providing a three dimensional matrix structure using secondary ingredients (e.g., polymers, clay and/or silicate material). The composition may comprise a structurant, from 0.01 to 5 wt. %, or from 0.1 to 2.0 wt. %. The structurant is typically selected from the group consisting of diglycerides and triglycerides, ethylene glycol distearate, microcrystalline cellulose, cellulose-based materials, microfiber cellulose, hydrophobically modified alkali-swellable emulsions such as Polygel W30 (3VSigma), biopolymers, xanthan gum, gellan gum, and mixtures thereof. A suitable structurant includes hydrogenated castor oil, and non-ethoxylated derivatives thereof. A suitable structurant is disclosed in U.S. Pat. No. 6,855,680. Such structurants have a thread-like structuring system having a range of aspect ratios. Other suitable structurants and the processes for making them are described in WO 2010/034736.

Conditioning Agents—The composition of the present invention may include a high melting point fatty compound. The high melting point fatty compound useful herein has a melting point of 25° C. or higher and is selected from the group consisting of fatty alcohols, fatty acids, fatty alcohol derivatives, fatty acid derivatives, and mixtures thereof. Such compounds of low melting point are not intended to be included in this section. Non-limiting examples of the high melting point compounds are found in International Cosmetic Ingredient Dictionary, Fifth Edition, 1993, and CTFA Cosmetic Ingredient Handbook, Second Edition, 1992.

The high melting point fatty compound is included in the composition at a level of from 0.1 to 40 wt. %, from 1 to 30 wt. %, from 1.5 to 16 wt. %, from 1.5 to 8 wt. % in view of providing improved conditioning benefits such as slippery feel during the application to wet hair, softness and moisturized feel on dry hair.

The compositions of the present invention may contain a cationic polymer. Concentrations of the cationic polymer in the composition typically range from 0.05 to 3 wt. %, from 0.075 to 2.0 wt. %, or from 0.1 to 1.0 wt. %. Suitable cationic polymers will have cationic charge densities of at least 0.5 meq/gm, at least 0.9 meq/gm, at least 1.2 meq/gm, at least 1.5 meq/gm, or less than 7 meq/gm, and less than 5 meq/gm, at the pH of intended use of the composition, which pH will generally range from pH 3 to pH 9, or between pH 4 and pH 8. Herein, "cationic charge density" of a polymer refers to the ratio of the number of positive charges on the polymer to the molecular weight of the polymer. The average molecular weight of such suitable cationic polymers will generally be between 10,000 and 10 million, between 50,000 and 5 million, or between 100,000 and 3 million.

Suitable cationic polymers for use in the compositions of the present invention contain cationic nitrogen-containing moieties such as quaternary ammonium or cationic protonated amino moieties. Any anionic counterions can be used in association with the cationic polymers so long as the polymers remain soluble in water, in the composition, or in a coacervate phase of the composition, and so long as the counterions are physically and chemically compatible with the essential components of the composition or do not otherwise unduly impair composition performance, stability or aesthetics. Nonlimiting examples of such counterions include halides (e.g., chloride, fluoride, bromide, iodide), sulfate and methylsulfate.

Nonlimiting examples of such polymers are described in the CTFA Cosmetic Ingredient Dictionary, 3rd edition, edited by Estrin, Crosley, and Haynes (The Cosmetic, Toiletry, and Fragrance Association, Inc., Washington, D.C. (1982)).

Other suitable cationic polymers for use in the composition include polysaccharide polymers, cationic guar gum derivatives, quaternary nitrogen-containing cellulose ethers, synthetic polymers, copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Complex coacervates of the cationic polymer can also be formed with other charged materials in the composition. Suitable cationic polymers are described in U.S. Pat. Nos. 3,962,418; 3,958,581; and US 2007/0207109.

The composition of the present invention may include a nonionic polymer as a conditioning agent. Polyalkylene glycols having a molecular weight of more than 1000 are useful herein. Useful are those having the following general formula:

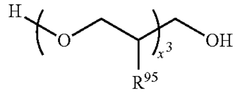

wherein $R^{95}$ is selected from the group consisting of H, methyl, and mixtures thereof. Conditioning agents, and in particular silicones, may be included in the composition.

The conditioning agents useful in the compositions of the present invention typically comprise a water insoluble, water dispersible, non-volatile, liquid that forms emulsified, liquid particles. Suitable conditioning agents for use in the composition are those conditioning agents characterized generally as silicones (e.g., silicone oils, cationic silicones, silicone gums, high refractive silicones, and silicone resins), organic conditioning oils (e.g., hydrocarbon oils, polyolefins, and fatty esters) or combinations thereof, or those conditioning agents which otherwise form liquid, dispersed particles in the aqueous surfactant matrix herein. Such conditioning agents should be physically and chemically compatible with the essential components of the composition, and should not otherwise unduly impair composition stability, aesthetics or performance.

The concentration of the conditioning agent in the composition should be sufficient to provide the desired conditioning benefits. Such concentration can vary with the conditioning agent, the conditioning performance desired, the average size of the conditioning agent particles, the type and concentration of other components, and other like factors.

The concentration of the silicone conditioning agent typically ranges from 0.01 to 10 wt. %. Non-limiting examples of suitable silicone conditioning agents, and optional suspending agents for the silicone, are described in U.S. Reissue Pat. No. 34,584; U.S. Pat. Nos. 5,104,646; 5,106,609; 4,152,416; 2,826,551; 3,964,500; 4,364,837; 6,607,717; 6,482,969; 5,807,956; 5,981,681; 6,207,782; 7,465,439; 7,041,767; 7,217,777; US 2007/0286837; US 2005/0048549; US 2007/0041929; GB 849433; DE 10036533, which are all incorporated herein by reference; Chemistry and Technology of Silicones, New York: Academic Press (1968); General Electric Silicone Rubber Product Data Sheets SE 30, SE 33, SE 54 and SE 76; Silicon Compounds, Petrarch Systems, Inc. (1984); and in Encyclopedia of Polymer Science and Engineering, vol. 15, 2d ed., pp. 204-308, John Wiley & Sons, Inc. (1989).

The compositions of the present invention may also comprise from 0.05 to 3 wt. % of at least one organic conditioning oil as the conditioning agent, either alone or in combination with other conditioning agents, such as the silicones (described herein). Suitable conditioning oils include hydrocarbon oils, polyolefins, and fatty esters. Also suitable for use in the compositions herein are the conditioning agents described in U.S. Pat. Nos. 5,674,478 and 5,750,122 or in U.S. Pat. Nos. 4,529,586; 4,507,280; 4,663,158; 4,197,865; 4,217,914; 4,381,919; and 4,422,853.

Hygiene and malodour—The compositions of the present invention may also comprise one or more of ricinoleic acid, a ricinoleic salt, or a ricinoleic ester, thymol, quaternary ammonium salts such as Bardac®, polyethylenimines (such as Lupasol® from BASF) and zinc complexes thereof, silver and silver compounds, especially those designed to slowly release $Ag^+$ or nano-silver dispersions.

Probiotics—The compositions may comprise probiotics such as those described in WO 2009/043709.

Suds Boosters—If high sudsing is desired, suds boosters such as the $C_{10}$-$C_{16}$ alkanolamides or $C_{10}$-$C_{14}$ alkyl sulphates can be incorporated into the compositions, typically at 1 to 10 wt. % levels. The $C_{10}$-$C_{14}$ monoethanol and diethanol amides illustrate a typical class of such suds boosters. Use of such suds boosters with high sudsing adjunct surfactants such as the amine oxides, betaines and sultaines noted above is also advantageous. If desired, water-soluble magnesium and/or calcium salts such as $MgCl_2$, $MgSO_4$, $CaCl_2$, $CaSO_4$ and the like, can be added at levels of, typically, 0.1 to 2 wt. %, to provide additional suds and to enhance grease removal performance.

Suds Suppressors—Compounds for reducing or suppressing the formation of suds can be incorporated into the compositions of the present invention. Suds suppression can be of particular importance in the so-called "high concentration cleaning process" as described in U.S. Pat. Nos. 4,489,455 and 4,489,574, and in front-loading-style washing machines. A wide variety of materials may be used as suds suppressors, and suds suppressors are well known to those skilled in the art. See, e.g., Kirk Othmer Encyclopedia of Chemical Technology, Third Edition, Volume 7, pp. 430-447 (John Wiley & Sons, Inc., 1979). Examples of suds suppressors include monocarboxylic fatty acid and soluble salts therein, high molecular weight hydrocarbons such as paraffin, fatty acid esters (e.g., fatty acid triglycerides), fatty acid esters of monovalent alcohols, aliphatic $C_{18}$-$C_{40}$ ketones (e.g., stearone), N-alkylated amino triazines, waxy hydrocarbons preferably having a melting point below about 100° C., silicone suds suppressors, and secondary alcohols. Suds suppressors are described in U.S. Pat. Nos. 2,954,347; 4,265,779; 4,265,779; 3,455,839; 3,933,672; 4,652,392; 4,978,471; 4,983,316; 5,288,431; 4,639,489; 4,749,740; 4,798,679; 4,075,118; EP 89307851.9; EP 150872; and DOS 2,124,526.

For any detergent compositions to be used in automatic laundry washing machines, suds should not form to the extent that they overflow the washing machine. Suds suppressors, when utilized, are preferably present in a "suds suppressing amount. By "suds suppressing amount" is meant that the formulator of the composition can select an amount of this suds controlling agent that will sufficiently control the suds to result in a low-sudsing laundry detergent for use in automatic laundry washing machines.

The compositions herein will generally comprise from 0 to 10 wt. % of suds suppressor. When utilized as suds suppressors, monocarboxylic fatty acids, and salts therein, will be present typically in amounts up to 5 wt. %. Preferably, from 0.5 to 3 wt. % of fatty monocarboxylate suds suppressor is utilized. Silicone suds suppressors are typically utilized in amounts up to 2 wt. %, although higher amounts may be used. Monostearyl phosphate suds suppressors are generally utilized in amounts ranging from 0.1 to 2 wt. %. Hydrocarbon suds suppressors are typically utilized in amounts ranging from 0.01 to 5.0 wt. %, although higher levels can be used. The alcohol suds suppressors are typically used at 0.2 to 3 wt. %.

The compositions herein may have a cleaning activity over a broad range of pH. In certain embodiments the compositions have cleaning activity from pH 4 to pH 11.5. In other embodiments, the compositions are active from pH 6 to pH 11, from pH 7 to pH 11, from pH 8 to pH 11, from pH 9 to pH 11, or from pH 10 to pH 11.5.

The compositions herein may have cleaning activity over a wide range of temperatures, e.g., from 10° C. or lower to 90° C. Preferably the temperature will be below 50° C. or 40° C. or even 30° C. In certain embodiments, the optimum temperature range for the compositions is from 10° C. to 20° C., from 15° C. to 25° C., from 15° C. to 30° C., from 20° C. to 30° C., from 25° C. to 35° C., from 30° C. to 40° C., from 35° C. to 45° C., or from 40° C. to 50° C.

Other Odor Reducing Ingredients

In an embodiment, a composition of the invention further comprises additional odor reducing agents.

In an embodiment the composition of the invention further comprising beta-cyclodextrin.

Ricinoleic Acid, its Salts, and Simple Esters

Besider a surfactant or surfactant system and a lipase, the composition of the invention may also comprise ricinoleic acid, its salts, or ricinoleaic esters. Examples include ricinoleic acid, glyceryl ricinoleate, glyceryl ricinoleate SE, ricinoleic acid, potassium ricinoleate, sodium ricinoleate, zinc ricinoleate, cetyl ricinoleate, ethyl ricinoleate, glycol ricinoleate, isopropyl ricinoleate, methyl ricinoleate, and octyldodecyl ricinoleate. In some embodiments, a composition of the invention comprises zinc ricinoleate, potassium ricinoleate, or sodium ricinoleate. In some embodiments, a composition of the invention comprises methyl ricinoleate, ethyl ricinoleate, isopropyl ricinoleate, or glycol ricinoleate. In some embodiments, a composition of the invention comprises zinc ricinoleate or methyl ricinoleate.

In a preferred embodiment, zinc ricinoleate and/or methyl ricinoleate constitutes 0.01-10 wt. %, preferably 0.1-3 wt. % of the detergent composition of the invention. In a preferred embodiment, methyl ricinoleate constitutes 0.3-1.5 wt. % of the detergent composition of the invention. In a preferred embodiment the zinc ricinoleate is dosed at a concentration of 1-50 mg/L, preferably 5-25 mg/L, in particular, 10-20 mg/L wash water. In a preferred embodiment, the ratio between lipase and zinc ricinoleate and/or methyl ricinoleate (w/w) is between 1:50 and 1:1, such as between 1:40 and 1:2, such as between 1:30 and 1:3.

When using zinc ricinoleate and/or methyl ricinoleate in accordance with the method of the invention the odor, such as butyric acids, generated by the lipase in the composition is reduced by at least 5%, at least 10%, at least 20%, at least 30%, at least 40%, at least 50%, at least 60%, at least 70%, at least 80%, at least 90%, at least 95%, at least 97% compared to cleaning or washing at the same conditions but without zinc ricinoleate and/or methyl ricinoleate being present.

Form of the Composition

The composition of the invention is for use in laundry cleaning or washing methods. The composition of the invention is in particular liquid but may also be solid or powder. In one aspect the invention relates to a composition, wherein the form of the composition is selected from the group consisting of a regular, compact or concentrated liquid; a gel; a paste; a soap bar; a regular or a compacted powder; a granulated solid; a homogenous or a multilayer tablet with two or more layers (same or different phases); a pouch having one or more compartments; a single or a multi-compartment unit dose form; or any combination thereof.

The form of the composition may separate the components physically from each other in compartments such as, e.g., water dissolvable pouches or in different layers of tablets. Thereby negative storage interaction between components can be avoided. Different dissolution profiles of each of the compartments can also give rise to delayed dissolution of selected components in the wash solution.

Pouches can be configured as single or multicompartments. It can be of any form, shape and material which is suitable for hold the composition, e.g., without allowing the release of the composition to release of the composition from the pouch prior to water contact. The pouch is made from water soluble film which encloses an inner volume. Said inner volume can be divided into compartments of the pouch. Preferred films are polymeric materials preferably polymers which are formed into a film or sheet. Preferred polymers, copolymers or derivates thereof are selected polyacrylates, and water-soluble acrylate copolymers, methyl cellulose, carboxy methyl cellulose, sodium dextrin, ethyl cellulose, hydroxyethyl cellulose, hydroxypropyl methyl cellulose, malto dextrin, poly methacrylates, most preferably polyvinyl alcohol copolymers and, hydroxypropyl methyl cellulose (HPMC). Preferably the level of polymer in the film for example PVA is at least about 60%. Preferred average molecular weight will typically be about 20,000 to about 150,000. Films can also be of blended compositions comprising hydrolytically degradable and water-soluble polymer blends such as polylactide and polyvinyl alcohol (known under the Trade reference M8630 as sold by Mono-Sol LLC, Indiana, USA) plus plasticisers like glycerol, ethylene glycerol, propylene glycol, sorbitol and mixtures thereof. The pouches can comprise a solid laundry cleaning composition or part components and/or a liquid cleaning composition or part components separated by the water-soluble film. The compartment for liquid components can be different in composition than compartments containing solids (US 2009/0011970).

Water-Soluble Film—The compositions of the present invention may also be encapsulated within a water-soluble film. Preferred film materials are preferably polymeric materials. The film material can, e.g., be obtained by casting, blow-moulding, extrusion or blown extrusion of the polymeric material, as known in the art. Preferred polymers, copolymers or derivatives thereof suitable for use as pouch material are selected from polyvinyl alcohols, polyvinyl pyrrolidone, polyalkylene oxides, acrylamide, acrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatine, natural gums such as xanthum and carragum. More preferred polymers are selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and most preferably selected from polyvinyl alcohols, polyvinyl alcohol copolymers and hydroxypropyl methyl cellulose (HPMC), and combinations thereof. Preferably, the level of polymer in the pouch material, e.g., a PVA polymer, is at least 60 wt. %. The polymer can have any weight average molecular weight, preferably from about 1,000 to 1,000,000, from about 10,000 to 300,000, from about 20,000 to 150,000. Mixtures of polymers can also be used as the pouch material.

Naturally, different film material and/or films of different thickness may be employed in making the compartments of the present invention. A benefit in selecting different films is that the resulting compartments may exhibit different solubility or release characteristics.

Preferred film materials are PVA films known under the MonoSol trade reference M8630, M8900, H8779 and those described in U.S. Pat. Nos. 6,166,117 and 6,787,512 and PVA films of corresponding solubility and deformability characteristics.

The film material herein can also comprise one or more additive ingredients. For example, it can be beneficial to add plasticisers, e.g., glycerol, ethylene glycol, diethyleneglycol, propylene glycol, sorbitol and mixtures thereof. Other additives include functional detergent additives to be delivered to the wash water, e.g., organic polymeric dispersants, etc.

In a preferred embodiment, the parent lipase is a *Thermomyces lanuginosus* lipase (TLL), e.g., in particular the lipase shown in SEQ ID NO: 1.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen und Zellkulturen GmbH (DSMZ), Centraalbureau Voor Schimmelcultures (CBS), and Agricultural Research Service Patent Culture Collection, Northern Regional Research Center (NRRL).

The parent lipase may be identified and obtained from other sources including microorganisms isolated from nature (e.g., soil, composts, water, etc.) or DNA samples obtained directly from natural materials (e.g., soil, composts, water, etc.) using the above-mentioned probes. Techniques for isolating microorganisms and DNA directly from natural habitats are well known in the art. A polynucleotide encoding a parent may then be obtained by similarly screening a genomic DNA or cDNA library of another microorganism or mixed DNA sample. Once a polynucleotide encoding a parent has been detected with the probe(s), the polynucleotide can be isolated or cloned by utilizing techniques that are known to those of ordinary skill in the art (see, e.g., Sambrook et al., 1989, supra).

The following paragraphs describe embodiments of the invention:

1. A detergent composition capable of reducing odor generated by a lipase during cleaning or washing of laundry comprising:

(a) a surfactant or a surfactant system;

(b) a lipase; and (c) ricinoleic acid, a ricinoleic salt, or a ricinoleic ester.

2. The composition of paragraph 1, wherein the composition comprises zinc ricinoleate or methyl ricinoleate.

3. A detergent composition capable of reducing odor generated by a lipase during cleaning or washing of laundry comprising:

(a) a surfactant or a surfactant system;

(b) a lipase; and (c) zinc ricinoleate.

4. The composition of any of paragraphs 1-3, wherein the composition is a liquid composition, in particular wherein the composition comprises water.

5. The composition of any of paragraphs 1-4, wherein the surfactant(s) is(are) present at a level of from 0.1 to 60 wt. %, from 0.2 to 40 wt. %, from 0.5 to 30 wt. %, from 1 to 50 wt. %, from 1 to 40 wt. %, from 1 to 30 wt. %, from 1 to 20 wt. %, from 3 to 10 wt. %, from 3 to 5 wt. %, from 5 to 40 wt. %, from 5 to 30 wt. %, from 5 to 15 wt. %, from 3 to 20 wt. %, from 3 to 10 wt. %, from 8 to 12 wt. %, from 10 to 12 wt. %, from 20 to 25 wt. % or from 25-60 wt. %.

6. The composition of any of paragraphs 1-5, comprising a surfactant or surfactant system wherein the surfactant is selected from the group consisting of nonionic surfactants, anionic surfactants, cationic surfactants, ampholytic surfactants, zwitterionic surfactants, semi-polar nonionic surfactants and mixtures thereof.

7. The composition of any of paragraphs 1-6, wherein the composition comprises one or more anionic surfactants and/or one or more nonionic surfactants.

8. The composition of any of paragraphs 1-7, wherein the composition comprises one or more anionic surfactants, preferably linear alkylbenzenesulfonic acid (LAS), alcohol ethersulfate (AEOS) and/or alkyl sulfate (AS), in particular, sodium lauryl sulfate (SLS) and/or sodium laureth sulfate (SLES).

9. The composition of any of paragraphs 1-8, wherein the composition comprises one or more non-ionic surfactants, preferably alcohol ethoxylate (AEO), in particular, linear alcohol (C12-15) ethoxylate (LAE).

10. The composition of any of paragraphs 1-9, wherein the composition comprises one or more anionic surfactants and one or more nonionic surfactants.

11. The composition of any of paragraphs 1-10, wherein the composition comprises the anionic surfactants LAS, SLES and SLS and the nonionic surfactant LAE.

12. The composition of any of paragraphs 1-10, wherein the composition comprises the anionic surfactants SLES and SLS and the nonionic surfactant AEO.

13. The composition of any of paragraphs 1-10, wherein the composition comprises the components in Model J detergent disclosed in Example 1.

14. The composition of any of paragraphs 1-10, wherein the composition comprises the components in Model E1 detergent disclosed in Example 2.

15. The composition of any of paragraphs 1-14, which further comprises one or more components selected from the group of builders, chelating agents, dye transfer inhibiting agents, dispersants, enzymes, and enzyme stabilizers, catalytic materials, bleach activators, hydrogen peroxide, sources of hydrogen peroxide, preformed peracids, polymeric dispersing agents, clay soil removal/anti-redeposition agents, brighteners, suds suppressors, dyes, hueing dyes, perfumes, perfume delivery systems, structure elasticizing agents, fabric softeners, carriers, hydrotropes, processing aids, solvents and/or pigments.

16. The composition of any of paragraphs 1-15, wherein the composition is for cleaning of laundry in need of wash.

17. The composition of any of paragraphs 1-16, wherein the composition is formulated as a regular, compact or concentrated liquid; a gel; a paste; a soap bar; a regular or a compacted powder; a granulated solid; a homogenous or a multilayer tablet with two or more layers (same or different phases); a pouch having one or more compartments; a single or a multi-compartment unit dose form; or any combination thereof.

18. The composition of any of paragraphs 1-17, wherein the lipase is a fungal or bacterial lipase.

19. The composition of any of paragraphs 1-18, wherein the composition comprises a fungal lipase derived from a strain of *Thermomyces lanuginosus* lipase (synonym *Humicola lanuginosa*) shown in SEQ ID NO: 1.

20. The composition of any of paragraphs 1-19, wherein the lipase is a variant of a parent lipase, wherein the parent lipase is selected from the group consisting of:

a) a polypeptide having at least 60%, at least 65%, at least 70%, at least 75%, at least 80%, at least 85%, at least 90%, at least 95% identity, at least 96%, at least 97%, at least 98%, or at least 99%, or 100% sequence identity to SEQ ID NO: 1;

b) a fragment of the polypeptide of SEQ ID NO: 1.

21. The composition of any of paragraphs 1-20, wherein the lipase is a variant having lipase activity and having at least 60%, at least 65%, at least 70%, at least 75%, at least 80%, at least 85%, at least 90%, at least 95% identity, at least 96%, at least 97%, at least 98%, or at least 99%, but less than 100% sequence identity to SEQ ID NO: 1.

22. The composition of any of paragraphs 1-21, wherein the lipase is a variant having lipase activity and has at least 60% but less than 100% sequence identity with SEQ ID NO: 1, and comprises substitutions at positions corresponding to T231R+N233R and at least one or more (e.g., several) of D96E, D111A, D254S, G163K, P256T, G91T and G38A of SEQ ID NO: 1.

23. The composition of any of paragraphs 1-22, wherein the lipase is a variant of a parent lipase, wherein the variant has lipase activity, has at least 60% but less than 100% sequence identity with SEQ ID NO: 1, and comprises substitutions at positions corresponding to T231R+N233R and at least one or more (e.g., several) of D96E, D111A, D254S, G163K, P256T, G91T and G38A of SEQ ID NO: 1 selected from the group of:

a. D27R+N33Q+G38A+G91T+D96E+D111A+G163K+T231R+N233R+D254S;
b. D27R+N33Q+G38A+G91T+D96E+D111A+G163K+T231R+N233R+P256T;
c. D27R+N33Q+G38A+G91T+D96E+G163K+T231R+N233R+D254S+P256T;
d. D27R+N33Q+G38A+D96E+D111A+G163K+T231R+N233R+D254S+P256T;
e. D27R+N33Q+G38A+D96E+D111A+T231R+N233R+D254S+P256T;
f. D27R+G38A+G91T+D96E+D111A+G163K+T231R+N233R+D254S;
g. D27R+G38A+G91T+D96E+D111A+G163K+T231R+N233R+D254S+P256T;
h. D27R+G38A+G91T+D96E+G163K+T231R+N233R+D254S+P256T;
i. D27R+G38A+D96E+D111A+G163K+E210Q+T231R+N233R+D254S+P256T;
j. D27R+G38A+D96E+D111A+G163K+T231R+N233R+D254S+P256T;
k. D27R+G38A+D96E+G163K+T231R+N233R+D254S+P256T
I. D27R+G91T+D96E+D111A+G163K+T231R+N233R+D254S+P256T;
m. D27R+D96E+D111A+G163K+T231R+N233R;
n. D27R+D96E+D111A+G163K+T231R+N233R+D254S+P256T;
o. D27R+D96E+D111A+T231R+N233R;
p. D27R+D96E+G163K+T231R+N233R+D254S;
q. D27R+G163K+T231R+N233R+D254S;
r. D27R+T231R+N233R+D254S+P256T;
s. N33Q+G38A+G91T+D96E+D111A+G163K+T231R+N233R+D254S+P256T;
t. N33Q+G38A+G91T+G163K+T231R+N233R+D254S;
u. N33Q+D96E+D111A+G163K+T231R+N233R+D254S+P256T;
v. N33Q+D96E+T231R+N233R;
w. N33Q+D111A+T231R+N233R;
x. N33Q+T231R+N233R+P256T;
y. G38A+D96E+D111A+T231R+N233R;
z. G91T+D96E+D111A+G163K+T231R+N233R+D254S+P256T;
aa. G91T+D96E+D111A+T231R+N233R;
bb. G91T+D96E+T231R+N233R;
cc. G91T+T231R+N233R+D254S+P256T;
dd. D96E+D111A+G163K+T231R+N233R;
ee. D96E+D111A+G163K+T231R+N233R+D254S+P256T;
ff. D96E+D111A+G163K+T231R+N233R+P256T;
gg. D96E+D111A+T231R+N233R;
hh. D96E+D111A+T231R+N233R+D254S;
ii. D96E+D111A+T231R+N233R+D254S+P256T
jj. D96E+D111A+T231R+N233R+P256T;
kk. D96E+G163K+T231R+N233R+D254S;
ll. D96E+G163K+T231R+N233R+D254S+P256T;
mm. D96E+T231R+N233R;
nn. D96E+T231R+N233R+D254S;
oo. D96E+T231R+N233R+D254S+P256T;
pp. D96E+T231R+N233R+P256T;
qq. D111A+G163K+T231R+N233R+D254S+P256T;
rr. D111A+T231R+N233R;
ss. D111A+T231R+N233R+D254S+P256T;

tt. G163K+T231R+N233R+D254S;

uu. T231R+N233R+D254S+P256T;

vv. T231R+N233R+P256T.

24. The composition of any of paragraphs 1-23, wherein the lipase is a variant of a parent lipase, wherein said variant (a) comprises a modification in at least one position corresponding to positions E1, V2, N33, F51, E56, L69, K98, V176, H198, E210, Y220, L227, and K237 of SEQ ID NO: 1; and optionally further comprises a modification in at least one position corresponding to positions D27, G38, D96, D111, G163, T231, N233, D254, and P256 of SEQ ID NO: 1;

(b) has a sequence identity of at least 60% but less than 100% to SEQ ID NO: 1;

(c) has lipase activity.

25. The composition of paragraph 24, wherein said lipase variant comprises a modification in at least one of the following positions: E1, V2, D27, N33, G38, F51, E56, L69, D96, K98, D111, G163, V176, H198, E210, Y220, L227, T231, N233, K237, D254, and P256, wherein numbering is according to SEQ ID NO: 1.

26. The composition of paragraph 24 or 25, wherein said lipase variant comprises at least one of the following modifications; E1C, V2Y, D27R, N33K, N33Q, G38A, F51V, E56K, L69R, D96E, D96L, K981, K98Q, D111A, G163K, V176L, $H_{198}$S, E210K, Y220F, L227G, T231R, N233R, N233C, K237C, D254S, and P256T, wherein numbering is according to SEQ ID NO: 1.

27. The composition of any of paragraphs 24-26, wherein said lipase variant further comprises one of the substitutions selected from the group of: S54T, S83T, G91A, A150G, 1255A, and E239C.

28. The composition of any of paragraphs 24-27, wherein the lipase variant comprises substitutions E1C+N233C and one or more additional substitutions.

29. The composition of any of paragraphs 24-28, wherein the variant has lipase activity, has at least 60% but less than 100% sequence identity with SEQ ID NO: 1 and comprises or consists of substitutions corresponding to one of the following set of substitutions using SEQ ID NO: 1 for numbering:

| |
|---|
| E1C + V2A + N233C |
| E1C + V2I + N233C |
| E1C + V2K + N233C |
| E1C + V2N + N233C |
| E1C + V2Y + N233C |
| E1C + D27R + N33K + G38A + F51V + D96E + K98I + D111A + G163K + H198S + Y220F + T231R + N233C |
| E1C + D27R + G38A + F51I + D96E + K98I + D111A + G163K + H198S + Y220F + T231R + N233C + D254S + P256T |
| E1C + D27R + G38A + F51L + D96E + K98I + D111A + G163K + H198S + Y220F + T231R + N233C + D254S + P256T |
| E1C + D27R + G38A + F51L + K98I + D111A + G163S + H198S + Y220F + T231R + N233C + P256T |
| E1C + D27R + G38A + F51V + D96E + K98I + D111A + G163K + H198S + Y220F + T231R + N233C + D254S + P256T |
| E1C + D27R + G38A + F51V + D96E + K98I + D111A + G163K + H198S + Y220F + T231R + N233C + P256T |
| E1C + D27R + G38R + F51L + D96E + K98I + D111A + G163K + H198S + Y220F + T231R + N233C + D254S + P256T |
| E1C + D27R + G38R + F51V + D96E + K98I + D111A + G163K + H198S + Y220F + T231R + N233C + D254S + P256T |
| E1C + D27R + F51I + E56R + K98E + T231R + N233C |
| E1C + D27R + F51I + E56R + K98E + T231R + N233C + D254S |
| E1C + D27R + F51L + D96E + K98I + D111A + G163K + H198S + Y220F + T231R + N233C + D254S + P256T |
| E1C + D27R + F51L + D96E + K98I + D111A + G163K + H198S + Y220F + T231R + N233C + P256T |
| E1C + D27R + F51L + D96E + K98I + D111A + G163S + H198S + Y220F + T231R + N233C + P256T |
| E1C + D27R + F51L + D96I + K98I + D111A + G163K + H198S + Y220F + T231R + N233C + P256T |
| E1C + D27R + F51V + D96E + K98I + D111A + G163K + H198S + Y220F + T231R + N233C + P256T |
| E1C + D27R + F51V + D96E + K98I + D111A + G163S + H198S + Y220F + T231R + N233C + D254S + P256T |
| E1C + D27R + F51V + D96I + K98I + D111A + G163K + H198S + Y220F + T231R + N233C + D254S + P256T |
| E1C + D27R + F51V + K98I + D111A + G163K + H198S + Y220F + T231R + N233C + D254S + P256T |
| E1C + D27R + F51Y + N233C |
| E1C + N33K + N233C |
| E1C + N33Q + N233C |
| E1C + G38A + F51V + D96E + K98I + D111A + G163K + H198S + Y220F + T231R + N233C + D254S + P256T |
| E1C + G38A + F51V + D96E + K98I + D111A + G163K + H198S + Y220F + T231R + N233C + P256T |
| E1C + G38A + N233C |
| E1C + G38R + F51V + D96E + K98I + D111A + G163K + H198S + Y220F + T231R + N233C + D254S + P256T |
| E1C + F51I + D96E + K98I + D111A + G163K + H198S + Y220F + T231R + N233C + D254S + P256T |
| E1C + F51I + N233C |
| E1C + F51L + D96E + K98I + D111A + G163K + H198S + Y220F + T231R + N233C + D254S + P256T |
| E1C + F51L + N233C |
| E1C + F51M + N233C |
| E1C + F51V + D96E + K98I + D111A + G163K + H198S + Y220F + T231R + N233C + D254S + P256T |
| E1C + F51V + D96E + K98I + D111A + G163K + H198S + Y220F + T231R + N233C + P256T |
| E1C + F51V + D96E + K98I + D111A + G163S + H198S + Y220F + T231R + N233C + P256T |
| E1C + F51V + D96I + K98I + D111A + G163K + H198S + Y220F + T231R + N233C + D254S + P256T |
| E1C + F51V + K98I + D111A + G163K + H198S + Y220F + T231R + N233C + D254S + P256T |
| E1C + E56K + N233C |
| E1C + E56Q + N233C |
| E1C + E56R + N233C |

-continued

| |
|---|
| E1C + E56S + N233C |
| E1C + L69C + N233C |
| E1C + L69F + N233C |
| E1C + L69H + N233C |
| E1C + L69R + N233C |
| E1C + L69S + N233C |
| E1C + L69T + N233C |
| E1C + L69V + N233C |
| E1C + D96E + N233C |
| E1C + D96L + N233C |
| E1C + K98E + N233C |
| E1C + K98I + N233C |
| E1C + K98Q + N233C |
| E1C + K98R + N233C |
| E1C + K98T + N233C |
| E1C + K98V + N233C |
| E1C + D111A + N233C |
| E1C + L147S + N233C + D254S |
| E1C + V176L + N233C |
| E1C + V176M + N233C |
| E1C + H198D + N233C |
| E1C + H198G + N233C |
| E1C + H198L + N233C |
| E1C + H198S + N233C |
| E1C + H198T + N233C |
| E1C + H198Y + N233C |
| E1C + E210A + N233C |
| E1C + E210K + N233C |
| E1C + E210N + N233C |
| E1C + E210Q + N233C |
| E1C + E210R + N233C |
| E1C + E210T + N233C |
| E1C + Y220F + N233C |
| E1C + L227F + N233C |
| E1C + L227G + N233C |
| E1C + L227R + N233C |
| E1C + T231R + N233C |
| E1C + N233C |
| E1C + N233C + D254S |
| E1C + N233C + P256T |
| E1C + K237C |

30. The composition of any of paragraphs 1-29, further comprising one or more enzymes selected from: alpha-amylase, proteases, cellulases, phospholipases, cutinases, pectinases, mannanases, pectate lyases, phosphodiesterases (PDEs), deoxyribonucleases (DNases), or mixtures thereof.

31. The composition of any of paragraphs 1-30, further comprising beta-cyclodextrin.

32. The composition of any of paragraphs 1-31, comprising:

a) zinc ricinoleate at 0.01-10 wt. %, preferably 0.1-3 wt. % of the detergent composition; or b) methyl ricinoleate at 0.01-10 wt. %, preferably 0.3-1.5 wt. % of the detergent composition.

33. The composition of any of paragraphs 1-31, comprising zinc ricinoleate at 0.01-10 wt. %, preferably 0.1-3 wt. % of the detergent composition.

34. The composition of any of paragraphs 1-31, comprising methyl ricinoleate at 0.01-10 wt. %, preferably 0.3-1.5 wt. % of the detergent composition.

35. The composition of any of paragraphs 1-31, wherein the ratio between lipase and zinc ricinoleate and/or methyl ricinoleate is between 1:50 and 1:1, such as between 1:40 and 1:2, such as between 1:30 and 1:3.

36. A method for cleaning or washing of laundry comprising contacting the laundry with a composition of any of paragraphs 1-35.

37. The method of paragraph 36, wherein the laundry includes textiles, clothes, linen or the like, wherein the laundry may be made from any material including yarns, yarn intermediates, fibers, non-woven materials, natural materials, synthetic materials, and any other textile material, fabrics made of these materials and products made from fabrics (e.g., garments and other articles).

38. The method of paragraph 36 or 37, wherein the laundry is in the form of knits, wovens, denims, non-wovens, felts, yarns, and towelling.

39. The method of any of paragraphs 36-38, wherein the laundry is cellulose based such as natural cellulosics, including cotton, flax/linen, jute, ramie, sisal or coir or manmade cellulosics (e.g., originating from wood pulp) including viscose/rayon, cellulose acetate fibers (tricell), lyocell or blends thereof.

40. The method of any of paragraphs 36-39, wherein the laundry is non-cellulose based such as natural polyamides including wool, camel, cashmere, mohair, rabbit and silk or synthetic polymers such as nylon, aramid, polyester, acrylic, polypropylene and spandex/elastane, or blends thereof as well as blends of cellulose based and non-cellulose based fibers.

41. The method of paragraph 40, wherein the blends are blends of cotton and/or rayon/viscose with one or more companion material such as wool, synthetic fiber (e.g., polyamide fiber, acrylic fiber, polyester fiber, polyvinyl chloride fiber, polyurethane fiber, polyurea fiber, aramid fiber), and/or cellulose-containing fiber (e.g., rayon/viscose, ramie, flax/linen, jute, cellulose acetate fiber, lyocell).

42. The method of any of paragraphs 36-41, wherein the laundry is conventional washable laundry, such as stained household laundry.

43. The method of any of paragraphs 36-42, wherein the laundry is in need of cleaning or washing.

44. The method of any of paragraphs 36-43, wherein the lipase is dosed at a concentration of 0.01-5 mg enzyme protein/L wash water, in particular 0.1-1 mg enzyme protein/L wash water.

45. The method of any of paragraphs 36-44, wherein zinc ricinoleate is dosed at a concentration of 1-50 mg/L, preferably 5-25 mg/L, in particular 10-20 mg/L wash water.

46. The method of any of paragraphs 36-44, wherein the composition comprises methyl ricinoleate, which constitutes 0.01-10 wt. %, preferably 0.3-1.5 wt. % of the detergent composition.

47. The method of any of paragraphs 36-44, wherein the ratio between lipase and zinc ricinoleate and/or methyl ricinoleate is between 1:50 and 1:1, such as between 1:40 and 1:2, such as between 1:30 and 1:3.

48. The method of any of paragraphs 36-47, wherein the odor generation is reduced by at least 5%, at least 10%, at least 20%, at least 30%, at least 40%, at least 50%, at least 60%, at least 70%, at least 80%, at least 90%, at least 95%, at least 97% compared to washing at the same conditions but without a lipase being present.

49. The method of any of paragraphs 36-48, wherein odor generation is determined by washing butter swatches using Model J detergent, lipase, and zinc ricinoleate at 20-40° C., preferably 25-35° C., in particular, 32° C. (90° F.) for 10-30 minutes, preferably 15-20 minutes, in particular 18 minutes, in particular, as described in Example 1.

50. The method of any of paragraphs 36-44 or 46-48, wherein odor generation is determined by agitating butter swatches using Model E1 detergent, lipase, methyl ricinoleate, and steel balls at 15-40° C., preferably 15-25° C., in particular, 20° C. (68° F.) for 15-35 minutes, preferably 20-30 minutes, in particular 25 minutes, in particular, as described in Example 2.

The present invention is further described by the following examples that should not be construed as limiting the scope of the invention.

EXAMPLES

Materials & Methods

- Lipase 1: *Thermomyces lanuginosus* lipase (TLL) shown in SEQ ID NO: 1 with the following substitutions: D27R+G38A+D96E+D111A+G163K+T231R+N233R+D254S+P256T (available from Novozymes A/S, Denmark);
- Lipase 2: *Thermomyces lanuginosus* lipase (TLL) shown in SEQ ID NO: 1 with the following substitutions: E1C+D27R+G38A+F51V+D96E+K981+D111A+G163K+$H_{198}$S+Y220F+T231R+N233C+D254S+P256T (available from Novozymes A/S, Denmark);
- Zinc Ricinoleate: Tego Sorb A 30, purchased from Evonik, containing 30% zinc ricinoleate.
- Methyl Ricinolate: Sigma-Aldrich R8750.

Lipase Activity Determined by p-Nitrophenyl (PNP) Assay

The hydrolytic activity of lipases may be determined by a kinetic assay using p-nitrophenyl acyl esters as substrate. A 100 mM stock solution in DMSO for each of the substrates p-nitrophenyl butyrate (C4), p-nitrophenyl caproate (C6), p-nitrophenyl caprate (C10), p-nitrophenyl laurate (C12) and p-nitrophenyl palmitate (C16) (all from Sigma-Aldrich Danmark A/S, Kirkebjerg Allé 84, 2605 Brondby; Cat.no.: C3: N-9876, C6: N-0502, C10: N-0252, C12: N-2002, C16: N-2752) is diluted to a final concentration of 1 mM 25 mM in the assay buffer (50 mM Tris; pH 7.7; 0.4% Triton X-100). The lipase in 50 mM Hepes; pH 8.0; 10 ppm Triton X-100; +/−20 mM $CaCl_2$ are added to the substrate solution in the following final protein concentrations: 0.01 mg/ml; $5\times10^{-3}$ mg/ml; $2.5\times10^{-4}$ mg/ml; and $1.25\times10^{-4}$ mg/mi in 96-well NUNC plates (Cat. No. 260836, Kamstrupvej 90, DK-4000, Roskilde). Release of p-nitrophenol by hydrolysis of a p-nitrophenyl acyl may be monitored at 405 nm for 5 minutes in 10 second intervals on a Spectra max 190 (Molecular Devices GmbH, Bismarckring 39, 88400 Biberach an der Riss, GERMANY).

Example 1

Lipase Odor Prevention Using Zinc Ricinoleate (ZR)

Washing experiments were performed using US HETL washes with 55 L volumes in order to assess the odor reduction from adding zinc ricinoleate (ZR) to a wash with Model J detergent with Lipase 1 and Lipase 2. 8 butter swatches are added to each wash. The butter swatches were made by adding 0.03 ml of melted unsalted butter (held in 115° F. (approx. 46° C.) water bath for 90 minutes) to 8 cm×10 cm AISE-P20 Pastel version: black (1%) reactive dye on Cotton swatches. The swatches were allowed to dry overnight and used the next day. The ballast load was 6 lb (approx. 2.7 kg) consisting of polyester cotton pillow cases, terry cotton towels, cotton t-shirts.

Wash Conditions:

- Water Volume: 55 L
- Ballast: 6 lb (approx. 2.7 kg)
- Dry Condition: Heated Dry
- Wash Temperature: 90° F. (approx. 32° C.)
- Water Hardness: 120 PPM
- Hardness (ratio Ca/Mg): 3:1
- Wash Time: 18 minutes
- Detergent Dose: 0.87 g/L
- Lipase Dosage: 0.45 mg Enzyme Protein (EP)/L
- Zinc ricinoleate Dosage: 13 mg/L
- Washers: HETL
- Number of swatches per Wash: 8
- Swatch Fabric: AISE-P20 Pastel version: black (1%) reactive dye on Cotton—145 cm width from Center For Testmaterials B.V.
- Swatch Size: 8 cm×10 cm
- Butter Dose: 0.03 mL per swatch Model J detergent composition

| Generic Chemical | Formulation wt. % |
|---|---|
| Linear Alkylbnezenesulfonic Acid (LAS) | 5 |
| Sodium Lauryl Sulfate (SLS) | 5 |
| Sodium Laureth Sulfate (SLES) | 10 |
| Coco fatty acid | 1 |
| Linear Alcohol (C12-15) Ethoxylate (LAE) | 4 |
| Monoethanol Amine (MEA) | 0.3 |
| Mono Propylene Glycol (MPG) | 3 |
| Ethanol | 1.5 |
| Diethylenetriaminepentaacetic Acid (DTPA) | 0.1 |
| Sodium Citrate | 4 |
| Sodium Formate | 1 |
| Sodium hydroxide | 0.5 |
| Water | 63.6 |

The butyric acid (odor) was detected using eight trained panelists. The washed butter swatches were dried in dryer. The dried swatches (1 swatch 8 cm×10 cm from each wash beaker) were placed in 50-120 mL glass jars with screw lids.

The swatches sat in the sealed jar at room temperature for 3 days. Each panel member of the sensory panel evaluated the odor of the swatches by opening the glass jar and sniffing the contents. The panel scored the odor by intensity on a scale from 0 to 4 with half numbers being allowed). A reference butter swatch washed without lipase was given the odor score of '1' and included as an external reference. A reference butter swatch washed with lipase was given the odor score of '4' and included as an external reference. For control, an internal reference sample was also included in the range of samples evaluated. The samples were presented to the panel members in random order. The odor intensity of the samples is shown in FIG. 1.

Example 2

Lipase Odor Prevention Using Methyl Ricinoleate

The butyric acid release (odor) from the lipase washed swatches were measured by Solid Phase Micro Extraction Gas Chromatography (SPME-GC) using the following method.

Model E1 detergent composition

| Generic Chemical | Formulation wt. % |
|---|---|
| alcohol ethoxylate (AEO) | 17 |
| Sodium Lauryl Sulfate (SLS) | 2.8 |
| Sodium Laureth Sulfate (SLES) | 8.5 |
| Coco fatty acid | 4.3 |
| Mono Propylene Glycol (MPG) | 5 |
| Ethanol | 2.5 |
| Phenoxyethanol | 0.5 |
| Sodium Citrate | 4 |
| Sodium Formate | 0.3 |
| Calcium chloride | 0.06 |
| Water | ~55* |

*pH adjusted to 8 by adding KOH/citric acid before water replenishment 40 mL of Model E1 detergent wash liquor was added to a 50 mL test tube. CS-10 butter swatches (CFT) were prepared from 5×5 cm swatches as round punch-outs with a 2-cm diameter. The butter swatches were prepared using methods similar to those described in Example 1. Lipase and methyl ricinoleate (Sigma-Aldrich R8750) were added to the tubes according to the table below, followed by the addition of 10 steel balls and 2 CS-10 swatches per tube. The tubes were continuously agitated at 40 rpm for 25 minutes at 20° C. The samples were then rinsed with cold water for 5 min and finally dried on filter paper for 16 hours.

The dried CS-10 swatches were transferred to Gas Chromatograph (GC) vials, which were then sealed. The samples were incubated at 30° C. for 24 hours, heated to 140° C. for 30 minutes, and stored at 20-25° C. for at least 4 hours before analysis. The analyses were performed on a Shimadzu Nexis GC-2030 equipped with a Carboxen PDMS SPME fiber (85 μm). Sampling from each GC vial was performed at 50° C. for 8 minutes with the SPME fiber in the head-space over the textile pieces as the sampled compounds were subsequently injected onto the column (injector temperature=250° C. Column flow=2 mL helium/minute. Column over temperature gradient: 0 minute=50° C., 2 minutes=50° C., 6 minutes 45 seconds=240° C.). Detection was performed using a Flame Ionization Detector (FID). Retention time for butyric acid was identified using an authentic standard. The area of each peak was measured and compared to the area of the reference peak (Lipase 2, no methyl ricinoleate). The data presents the peak sizes as the % peak size relative to the corresponding peak size from the Lipase 2 alone wash conditions. The experiment was performed twice. The Coefficient of Variation (CV) was 5%.

TABLE 2

Reduction in odor of samples containing methyl ricinoleate in model E1 detergent

| Lipase 2 | Methyl - ricinoleate (1 mM) | Methyl - ricinoleate (5 mM) | Butyric acid peak size normalized to lipase alone (%) |
|---|---|---|---|
| − | − | − | 0 |
| + | − | − | 100 |
| − | + | − | 0 |
| + | + | − | 88 |
| − | − | + | 0 |
| + | − | + | 89 |

The invention described and claimed herein is not to be limited in scope by the specific aspects herein disclosed, since these aspects are intended as illustrations of several aspects of the invention. Any equivalent aspects are intended to be within the scope of this invention. Indeed, various modifications of the invention in addition to those shown and described herein will become apparent to those skilled in the art from the foregoing description. Such modifications are also intended to fall within the scope of the appended claims. In the case of conflict, the present disclosure including definitions will control.

The invention claimed is:

1. A detergent composition capable of reducing odor generated by a lipase during cleaning or washing of laundry comprising:

(a) a surfactant or a surfactant system;

(b) a lipase; and (c) methyl ricinoleate.

2. The composition of claim 1, wherein the surfactant(s) is (are) present at a level of from 0.1 to 60 wt. %, from 0.2 to 40 wt. %, from 0.5 to 30 wt. %, from 1 to 50 wt. %, from 1 to 40 wt. %, from 1 to 30 wt. %, from 1 to 20 wt. %, from 3 to 10 wt. %, from 3 to 5 wt. %, from 5 to 40 wt. %, from 5 to 30 wt. %, from 5 to 15 wt. %, from 3 to 20 wt. %, from 3 to 10 wt. %, from 8 to 12 wt. %, from 10 to 12 wt. %, from 20 to 25 wt. % or from 25-60 wt. %.

3. The composition of claim 1, comprising a surfactant or surfactant system wherein the surfactant is selected from nonionic surfactants, anionic surfactants, cationic surfactants, ampholytic surfactants, zwitterionic surfactants, semi-polar nonionic surfactants and mixtures thereof.

4. The composition of claim 1, wherein the composition is formulated as a liquid, a concentrated liquid, a gel, a paste, a soap bar, a powder, a compacted powder, a granulated solid, a tablet, a multilayer tablet with two or more layers, a pouch, a pouch having multiple compartments, a unit dose form, a multi-compartment unit dose form, or any combination thereof.

5. The composition of claim 1, comprising methyl ricinoleate at 0.01-10 wt. % of the detergent composition.

6. A method for cleaning or washing of laundry comprising contacting the laundry with a composition of claim 1.

7. The method of claim 6, wherein the composition comprises methyl ricinoleate, which constitutes 0.01-10 wt. % of the detergent composition.

8. The method of claim 6, wherein the ratio between lipase and methyl ricinoleate is between 1:50 and 1:1.

9. The composition of claim 1, comprising methyl ricinoleate at 0.3-1.5 wt. % of the detergent composition.

10. The method of claim 6, wherein the composition comprises methyl ricinoleate at 0.3-1.5 wt. % of the detergent composition.

11. The method of claim 6, wherein the ratio between lipase and methyl ricinoleate is between 1:40 and 1:2.

12. The method of claim 6, wherein the ratio between lipase and methyl ricinoleate is between 1:30 and 1:3.

* * * * *